(12) United States Patent
Murade

(10) Patent No.: US 7,477,337 B2
(45) Date of Patent: Jan. 13, 2009

(54) ELECTRO-OPTICAL DEVICE AND ELECTRONIC APPARATUS HAVING THE SAME

(75) Inventor: Masao Murade, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 390 days.

(21) Appl. No.: 11/462,173

(22) Filed: Aug. 3, 2006

(65) Prior Publication Data
US 2007/0045626 A1    Mar. 1, 2007

(30) Foreign Application Priority Data

Aug. 5, 2005 (JP) ............................. 2005-227568
May 16, 2006 (JP) ............................. 2006-136167

(51) Int. Cl.
*G02F 1/136* (2006.01)

(52) U.S. Cl. ......................................................... 349/43

(58) Field of Classification Search .................... 349/43
See application file for complete search history.

(56) References Cited

U.S. PATENT DOCUMENTS 6,078,366 A     6/2000  Dohjo et al.

7,176,989 B2 *  2/2007  Takahara et al. .............. 349/39
2002/0176030 A1 11/2002 Matsumoto
2005/0161830 A1  7/2005 Iki

FOREIGN PATENT DOCUMENTS

EP          1 443 811 A2   8/2004
JP          A-2002-229061  8/2002

* cited by examiner

*Primary Examiner*—David Nelms
*Assistant Examiner*—Phu Vu
(74) *Attorney, Agent, or Firm*—Oliff & Berridge, PLC

(57) ABSTRACT

An electro-optical device includes: a substrate; a plurality of pixels provided in a pixel region on the substrate; peripheral circuits that are provided in a peripheral region surrounding the pixel region, the peripheral circuits being for controlling the plurality of pixels; a plurality of signal lines that supply signals for controlling the peripheral circuits, that at least partially overlap each other in the peripheral region, and that are formed in a plurality of different conductive layers with interlayer insulating layers interposed therebetween; and a shielding layer that is provided between layers where the plurality of signal lines overlap each other, so as to overlap the plurality of signal lines.

12 Claims, 15 Drawing Sheets

ELECTRO-OPTICAL DEVICE AND ELECTRONIC APPARATUS HAVING THE SAME

BACKGROUND

1. Technical Field

The present invention relates to an electro-optical device, such as a liquid crystal device, and an electronic apparatus having the electro-optical device, such as a liquid crystal projector.

2. Related Art

In an electro-optical device, a plurality of external circuit connection terminals are disposed along one edge of a substrate on which display electrodes, such as pixel electrodes, and a circuit unit, such as a data line driving circuit and a scanning line driving circuit for driving the display electrodes, are provided. On the substrate, a plurality of signal lines through which a plurality of different kinds of signal are supplied from the plurality of external circuit connection terminals to the circuit unit, such as the data line driving circuit and the scanning line driving circuit, are further provided.

For the signal lines, for example, JP-A-2002-229061 discloses a redundant wiring structure, in which additional wiring lines are formed in addition to original wiring lines by using the same layer as a conductive layer within pixels, thereby reducing the resistances of wiring lines without increasing the number of manufacturing processes.

However, since signal lines on which different kinds of signal run are patterned so that they do not overlap one another on a substrate in plan view, there is a limit to how much these signal lines are finely patterned on a single plane to narrow each gap between adjacent lines. For this reason, there is an intrinsic limitation in reducing area required for signal line layout, which makes it hard to miniaturize electro-optical devices. Further, as the electro-optical device becomes smaller, the gap between the signal lines becomes narrower. As a result, a problem occurs where interference between different kinds of signal supplied to the adjacent wiring lines increases. In particular, noises are generated in image signals due to, for example, a clock signal having a high frequency so as to operate the data line driving circuit or the like.

An advantage of some aspects of the invention is that it provides an electro-optical device, in which the size of a substrate can be reduced and high-quality images can be displayed by suppressing an effect of noises with respect to image signals, and an electronic apparatus having the electro-optical device.

According to a first aspect of the invention, an electro-optical device includes: a substrate; a plurality of pixels provided in a pixel region on the substrate; peripheral circuits that are provided in a peripheral region surrounding the pixel region, the peripheral circuits being for controlling the plurality of pixels; a plurality of signal lines that supply signals for controlling the peripheral circuits, that at least partially overlap each other in the peripheral region, and that are formed in a plurality of different conductive layers with interlayer insulating layers interposed therebetween; and a shielding layer that is provided between layers where the plurality of signal lines overlap each other, so as to overlap the plurality of signal lines.

In the electro-optical device described above, while the electro-optical device operates, for example, image signals, clock signals, various control signals, or power signals are supplied from an external circuit to the plurality of signal lines and the peripheral circuits through external circuit connection terminals. The plurality of signal lines and the peripheral circuits are provided in the peripheral region surrounding the pixel region on the substrate. Here, the 'peripheral circuits' according to the invention mean various circuits, which are provided or attached on the substrate, such as a scanning line driving circuit or a data line driving circuit for controlling or driving scanning lines or data lines electrically connected to pixels. For example, the data line driving circuit causes the image signals to be supplied to corresponding pixels through the data lines. At the same time, the scanning line driving circuit causes scanning signals to be supplied to corresponding pixels through the scanning lines. For example, a pixel-switching thin film transistor (hereinafter, referred to as 'pixel-switching TFT') provided for each pixel has a gate connected to a scanning line and serves to selectively supply an image signal to a pixel electrode according to the scanning signal. Thus, active-matrix driving becomes possible by driving electro-optical materials, such as liquid crystal, interposed between pixel electrodes and counter electrodes for each pixel. Further, a method of driving the electro-optical device is not limited to the active-matrix driving method. For example, various driving methods, such as a passive-matrix driving method or a segment driving method, can be used.

In the invention, the plurality of signal lines is formed on the plurality of different conductive layers with the interlayer insulating layers interposed therebetween, respectively. In addition, the plurality of signal lines at least partially overlap each other in the peripheral region, in plan view above the substrate. Accordingly, it is possible to dispose a large number of signal lines within a predetermined region of the substrate, as viewed from the normal direction of the substrate, such that the signal lines are not short-circuited by each other. In other words, it is possible to dispose a larger number of signal lines while making the width of each wiring line large. Thus, a pixel region can be made large, and at the same time, it is possible to reduce the size of the substrate by reducing the peripheral region. As a result, the entire liquid crystal device can be made small.

Further, in the invention, the plurality of signal lines is formed on different conductive layers among the plurality of conductive layers, respectively, according to the signal type, for example. Here, the 'signal type' means properties of a signal, such as a frequency of a signal or a level of a potential. For example, among the plurality of signal lines, signal lines through which signals having frequencies higher than a predetermined frequency are supplied are formed by using one conductive layer for high-frequency signal lines, and signal lines through which signals having frequencies lower than the predetermined frequency are supplied are formed by using one conductive layer for low-frequency signal lines different from that for the high-frequency signal lines.

Furthermore, in the invention, the shielding layer is provided between layers where the plurality of signal lines overlaps each other, so as to overlap the plurality of signal lines. That is, for the electrical shield between one signal line and another signal line among the plurality of signal lines, a shielding layer located between wiring portions, which overlap each other in plan view above the substrate on which the plurality of signal lines is formed, is included. Accordingly, it is possible to reduce electrical noises, which are generated on the one signal line and another signal line due to opposite signals, by means of the shielding layer. Here, the 'shielding layer' according to the invention means a layer having an electrical shielding function, such as conductivity. In addition, the 'shielding layer' may be an additional signal line located between one signal line and another signal line among the plurality of signal lines. That is, the invention includes a case, in which one of the plurality of conductive layers and the shielding layer are commonly used, and a case in which the shielding layer and one of the plurality of signal lines are commonly used. As a result, electrical noises, which are generated due to, for example, a clock signal for a data line driving circuit having high frequency as compared to image signals and affect the image signals, are reduced, which makes it possible to display high-quality images.

As described above, according to the electro-optical device of the invention, the size of the substrate can be reduced, which makes it possible to reduce the size of the electro-optical device. Further, since the electrical interference between different kinds of signal can be reduced, high-quality images can be displayed.

Further, in the above-mentioned aspect, the electro-optical device may further include a plurality of data lines and a plurality of scanning lines that are provided in the pixel region on the substrate so as to cross each other. In addition, preferably, the pixels are provided to correspond to intersections between the data lines and the scanning lines and each of the pixels includes a storage capacitor formed by sequentially stacking a lower electrode, a dielectric layer, and an upper electrode on the substrate, and each of the plurality of conductive layers and the shielding layer are the same layer as any one of the conductive layers forming the data lines, the lower electrodes, and the upper electrodes, respectively.

In the invention, each of the plurality of conductive layers and the shielding layer are the same layer as any one of the conductive layers forming the data lines, the lower electrodes, and the upper electrodes, respectively. Here, the 'same layer' means layers simultaneously formed during a manufacturing process, that is, the same kinds of layer. Basically, the 'same layer' does not necessarily extend as one layer, but includes separated parts of the one layer. Accordingly, the plurality of signal lines and the shielding layer can be formed at the same time as the data lines, the lower electrodes, or the upper electrodes are formed. That is, the plurality of signal lines and the shielding layer can be formed by using a plurality of conductive layers without causing the manufacturing process to be complicated.

In addition, due to the storage capacitor, the potential holding characteristic in a pixel electrode included in a pixel is improved and high-contrast display can be performed.

Furthermore, in the electro-optical device according to the abovementioned aspect, preferably, the plurality of signal lines is formed by using the conductive layers having different predetermined frequencies from each other.

In the invention, among the plurality of signal lines, for example, signal lines through which signals having frequencies higher than a predetermined frequency are supplied are formed by using one conductive layer for high-frequency signal lines, and signal lines through which signals having frequencies lower than the predetermined frequency are supplied are formed by using one conductive layer for low-frequency signal lines different from that for the high-frequency signal lines. For example, signal lines through which enable signals, clock signals, or the like for driving a data line driving circuit are supplied are formed as the high-frequency signal lines. On the other hand, for example, signal lines through which clock signals for driving a scanning line driving circuit are supplied, signal lines through which various control signals for controlling operations of peripheral circuits, such as the data line driving circuit or the scanning line driving circuit, are supplied, or signal lines for supplying image signals therethrough, that is, image signal lines are formed as the low-frequency signal lines. In addition, signal lines through which constant-potential or fixed-potential signals are supplied may be formed as the low-frequency signal lines. Accordingly, in the present embodiment, the shielding layer is located between layers in which the high-frequency signal lines and the low-frequency signal lines overlap each other, in plan view above the substrate. As a result, electrical effects of high-frequency signals, such as clock signals for driving the data line driving circuit, with respect to low-frequency signals, such as image signals, can be reduced. In other words, electrical interference between the low-frequency and high-frequency signals can be reduced. Thus, high-quality images can be displayed.

Furthermore, in the electro-optical device in which the plurality of signal lines is formed by using the conductive layers having different predetermined frequency ranges from each other, the plurality of signal lines includes first-frequency signal lines through which signals having a first frequency are supplied and second-frequency signal lines through which signals having a second frequency lower than the first frequency are supplied, and the first-frequency signal lines, the shielding layer, and the second-frequency signal lines are sequentially stacked in this order on the substrate with interlayer insulating layers interposed therebetween.

In this case, the first-frequency signal lines, the shielding layer, and the second-frequency signal lines are stacked in this order on the substrate with the interlayer insulating layers interposed therebetween. That is, for example, image signal lines for supplying image signals therethrough are formed as the second-frequency signal lines so as to be close to a surface of the stacked structure. Accordingly, it is possible to provide less contact holes required to electrically connect the second-frequency signal lines with the external circuit connection terminals formed in the vicinity of the surface of the stacked structure. As a result, the resistances of the second-frequency signal lines can be reduced. On the other hand, signal lines through which, for example, clock signals for driving peripheral circuits are supplied, are formed as the first-frequency signal lines so as to be close to the substrate in the stacked structure. In general, TFTs or the like, which are included in the peripheral circuits, are also formed to be close to the substrate. Accordingly, it is possible to reduce the number of contact holes between the first-frequency signal lines and the peripheral circuits. As a result, the first-frequency signal lines and the peripheral circuits can be easily connected to each other.

Furthermore, in the electro-optical device in which the plurality of signal lines is formed by using the conductive layers having different predetermined frequency ranges from each other, the plurality of signal lines includes first-frequency signal lines through which signals having a first frequency are supplied and second-frequency signal lines through which signals having a second frequency lower than the first frequency are supplied, and the second-frequency signal lines, the shielding layer, and the first-frequency signal lines are sequentially stacked in this order on the substrate with interlayer insulating layers interposed therebetween.

In this case, the second-frequency signal lines, the shielding layer, and the first-frequency signal lines are stacked on the substrate in this order with the interlayer insulating layers interposed therebetween. That is, signal lines through which, for example, clock signals for driving peripheral circuits are supplied, are formed as the first-frequency signal lines so as to be close to the surface of the stacked structure. Thus, it is possible to dissipate or eliminate heat, which is generated from the first-frequency signal lines because the frequencies of the first-frequency signal lines are high, through the surface of the stacked structure. That is, it is possible to easily prevent the first-frequency signal lines from being overheated.

Furthermore, in the electro-optical device including the first-frequency signal lines and the second-frequency signal lines, preferably, the shielding layer serves as a constant-potential wiring line through which a predetermined electric potential is supplied.

In this case, since the constant-potential wiring line serves as a shielding layer, it is possible to reduce the electrical interference between the different kinds of signal without causing the manufacturing process to be complicated, thereby displaying high-quality images. Further, the shielding layer may serve as a wiring line having a predetermined potential, through which a predetermined-potential signal whose electric potential changes to a predetermined electric potential every predetermined period, for example, the electric potential is inverted every predetermined period is supplied. Even in this case, since the electric potential of the signal is constant at each predetermined time, it is possible to reliably reduce the electrical interference in the same manner as described above.

Furthermore, in the electro-optical device in which the constant-potential wiring line serves as the shielding layer, preferably, the width of the constant-potential wiring line is at least partially larger than that of at least one of the first-frequency signal line and the second-frequency signal line, in plan view above the substrate.

In this case, since the width of the constant-potential wiring line is at least Partially larger than that of at least one of the first-frequency signal line and the second-frequency signal line, in plan view above the substrate, the constant-potential wiring line can reliably serve as the shielding layer so that the electrical interference between the first-frequency signal line and the second-frequency signal line can be reduced. In addition, since the width of the constant-potential wiring line is large, the resistance of the constant-potential wiring line can be reduced. Accordingly, due to the constant-potential wiring line, it is possible to supply stable constant-potential signals or stable constant-potential power to the peripheral circuits.

Furthermore, in the electro-optical device in which the constant-potential wiring line serves as the shielding layer, preferably, the width of the constant-potential wiring line is at least partially smaller than that of at least one of the first-frequency signal line and the second-frequency signal line, in plan view above the substrate.

In this case, it is possible to reduce a capacitance formed by the constant-potential wiring line, the interlayer insulating layer, and the first-frequency signal line or the second-frequency signal line, that is, it is possible to reduce wiring capacitance. Thus, it is possible to prevent the electric potential of the constant-potential signal from fluctuating due to effects of the first-frequency signal line and the second-frequency signal line. That is, it is possible to prevent electrical noises, which are generated due to the first-frequency signal line or the second-frequency signal line, from affecting image signals through constant-potential signals, such as constant-potential power.

Furthermore, in the electro-optical device in which the width of the constant-potential wiring line is smaller than that of at least one of the first-frequency signal line and the second-frequency signal line, preferably, the predetermined electric potential is a power supply potential having a first electric potential and a second electric potential lower than the first potential, the constant-potential wiring line includes a first-potential power line through which the first electric potential is supplied and a second-potential power line through which the second electric potential is supplied, the width of the constant-potential wiring line is at least partially smaller than any one of the first-frequency signal line and the second-frequency signal line, and the first-potential power line and the second-potential power line are disposed to be at least partially parallel to each other and to overlap the first-frequency signal line and the second-frequency signal line, respectively, in plan view above the substrate.

In this case, the first-potential power line and the second-potential power line are disposed to be at least partially parallel to each other and to overlap the first-frequency signal line and the second-frequency signal line, respectively, in plan view above the substrate. Accordingly, electrical noises between the first-frequency signal line and the second-frequency signal line are reduced by the first-potential power line and the second-potential power line.

In addition, in the case when the first-potential power line is provided between one first-frequency signal line and one second-frequency signal line and the second-potential power line is provided between another first-frequency signal line and another second-frequency signal line, an electrical effect between one first-frequency signal line and one second-frequency signal line is different from that between another first-frequency signal line and another second-frequency signal line. However, in the invention since the first-potential power line and the second-potential power line overlap the first-frequency signal mine and the second-frequency signal line, respectively, it is possible to obtain almost uniform shielding effects.

Furthermore, in the above-mentioned aspect, the electro-optical device may further include a relay layer that is formed by using the same layer as the shielding layer so as to electrically relay-connect upper signal lines of the plurality of signal lines with lower peripheral circuits of the peripheral circuits, the upper signal lines being formed above the shielding layer and the lower peripheral circuits being formed below the shielding layer.

In the invention, the upper signal lines are electrically connected to the lower peripheral circuits through the relay layer. That is, the upper signal lines and the relay layer are electrically connected to each other through contact holes provided in an interlayer insulating layer located between the upper signal lines and the relay layer, and the relay layer and the lower peripheral circuits are electrically connected to each other through contact holes provided in an interlayer insulating layer located between the relay layer and the lower peripheral circuits. Thus, it can be prevented from becoming difficult to connect each of the upper signal lines with each of the lower peripheral circuits through one contact hole, due to the large distance between layers forming the upper signal lines and the lower peripheral circuits. Further, since the relay line is formed by using the same layer as the shielding layer, the stacked structure and the manufacturing process do not become complicated.

Furthermore, in the above-mentioned aspect, the electro-optical device may further include a plurality of external circuit connection terminals that are electrically connected to the plurality of signal lines and the shielding layer, respectively, and are disposed in the peripheral region on the substrate. In addition, preferably, the shielding layer at least partially overlaps the signal lines electrically connected to the external circuit connection terminals adjacent to the corresponding external circuit connection terminals electrically connected to the shielding layer.

In the invention, the shielding layer at least partially overlaps the signal lines electrically connected to the external circuit connection terminals adjacent to the corresponding external circuit connection terminals electrically connected to the shielding layer. Accordingly, the shielding layer can exist even in a region where the plurality of signal lines are electrically connected to the external circuit connection terminals. As a result, it is further possible to reliably reduce the electrical interference between the plurality of signal lines that is formed on different conductive layers with interlayer insulating layers interposed therebetween.

According to another aspect of the invention, there is provided an electronic apparatus including the electro-optical device described above.

Since the electronic apparatus of the invention is configured to have the above-described electro-optical device of the invention, various electronic apparatuses, such as a projection type display device, a mobile phone, an electronic note, a word processor, a view finder type or monitor direct view type video tape recorder, a workstation, a video phone, a POS terminal, or a touch panel, which are capable of displaying high-quality images, can be implemented. Further, an electrophoresis device, such as an electronic paper, can be implemented by using the electronic apparatus of the invention.

Such effects and other advantages of the invention will be apparent from the following embodiments to be described.

BRIEF DESCRIPTION OF THE DRAWINGS

The invention will be described with reference to the accompanying drawings, wherein like numbers reference like elements.

FIG. 7 is an explanatory view illustrating a circuit configuration, which is related to a data line driving circuit and a sampling circuit, and the relationship of an electrical connection among signal lines and the like.

DESCRIPTION OF EXEMPLARY EMBODIMENTS

Hereinafter, preferred embodiments of the invention will be described with reference to the accompanying drawings. In the embodiments to be described below, a TFT-active-matrix-driving-type liquid crystal device having a built-in driving circuit, which is an example of an electro-optical device of the invention, will be exemplified.

First Embodiment

A liquid crystal device according to a first embodiment of the invention will be described with reference to FIGS. 1 to 17.

First, an overall configuration of the liquid crystal device according to the present embodiment will be described with reference to FIGS. 1 and 2. Here, FIG. 1 is a plan view illustrating the configuration of the liquid crystal device according to the present embodiment, and FIG. 2 is a cross-sectional view taken along the line II-II of FIG. 1.

Figure 1:
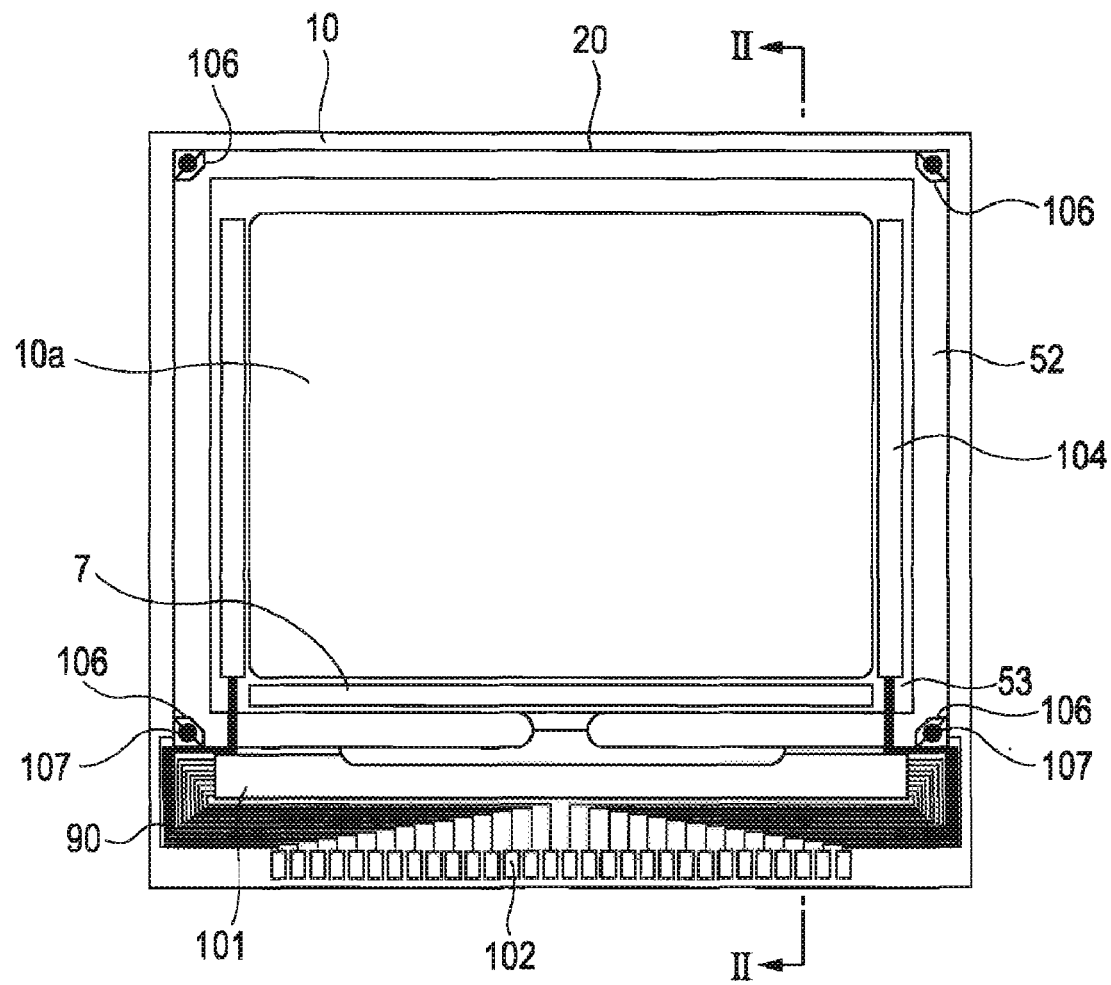
FIG. 1 is a plan view illustrating the overall configuration of a liquid crystal device according to a first embodiment of the invention.
Figure 2:
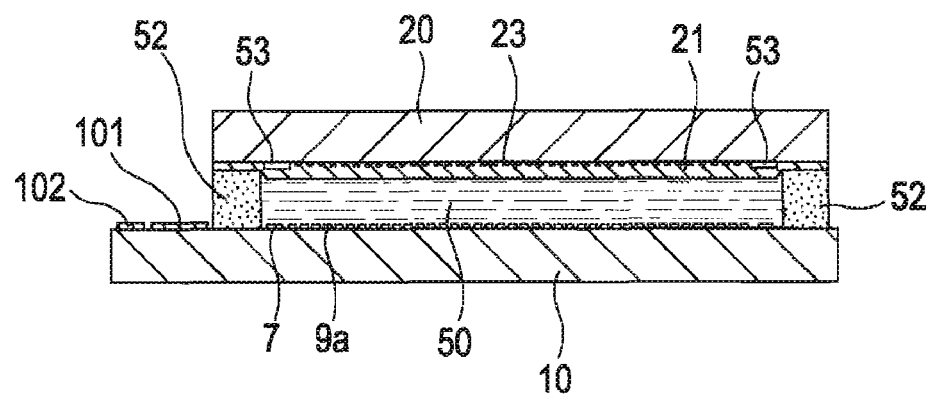
FIG. 2 is a cross-sectional view taken along the line II-II of FIG. 1.

In the liquid crystal device according to the presen-embodiment shown in FIGS. 1 and 2, a TFT array substrate 10 and a counter substrate 20 are disposed to face each other. A liquid crystal layer 50 is interposed between the TFT array substrate 10 and the counter substrate 20, and the TFT array substrate 10 and the counter substrate 20 are bonded to each other with a sealant 52 provided in a sealed region located around an image display region 10a that is an example of a 'pixel region' according to the present embodiment of the invention.

In FIG. 1, a frame-shaped light-shielding layer 53, which has a light-shielding property and defines a frame region of the image display region 10a, is provided at the counter substrate 20 side so as to be parallel to the inner sides of the sealed region where the sealant 52 is disposed. In a peripheral region located outside the sealed region where the sealant 52 is disposed, a data line driving circuit 101 and external circuit connection terminals 102 are provided along one side of the TFT array substrate 10. A sampling circuit 71s provided inwardly from the sealed region located along the one side so as to be covered by the frame-shaped light-shielding layer 53. Further, scanning line driving circuits 104 are provided inwardly from the sealed region located along two sides adjacent to the one side, so as to be covered by the frame-shaped light-shielding layer 53. In addition, on the TFT array substrate 10, upper and lower conducting terminals 106, which connect the two substrates to each other with upper and lower conducting members 107, are provided at regions opposite to the four corners of the counter substrate 20. Thus, the electrical conduction between the TFT array substrate 10 and the counter substrate 20 can be achieved. In addition, the data line driving circuit 101, the sampling circuit 7, and the scanning line driving circuits 104 are examples of a 'peripheral circuit' according to the embodiment of the invention.

On the TFT array substrate 10, wiring lines 90 are formed so as to electrically connect the external circuit connection terminals 102, the data line driving circuit 101, the scanning line driving circuits 104, the upper and lower conducting terminals 106, and the like to one another.

In FIG. 2, on the TFT array substrate 10, a stacked structure is formed in which pixel-switching TFTs (thin-film transistors) serving as driving elements and wiring lines, such as scanning lines and data lines, are formed. In the image display region 10a, pixel electrodes 9a are provided above the pixel-switching TFTs and the wiring lines, such as the scanning lines and the data lines. On the other hand, a light-shielding layer 23 is provided on the counter substrate 20 facing the TFT array substrate 10. In addition, counter electrodes 21 formed of a transparent material, such as ITO, are formed on the light-shielding layer 23 so as to face a plurality of pixel electrodes 9a.

Further, in addition to the data line driving circuit 101 and the scanning line driving circuits 104, a test circuit or a test pattern for testing the quality and defects of the liquid crystal device during a manufacturing process or at the time of shipping may be formed on the TFT array substrate 10.

Figure 3:
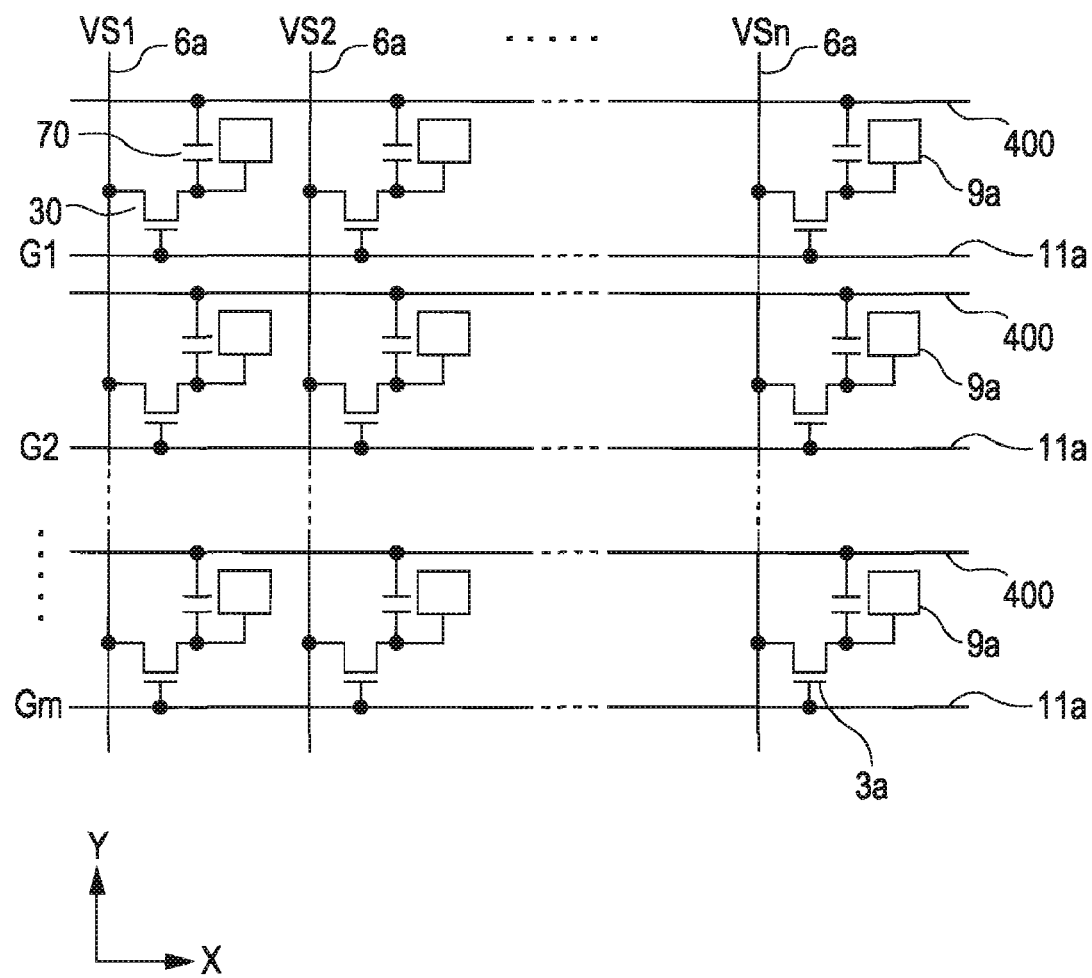
FIG. 3 is an equivalent circuit diagram illustrating various elements, wiring lines, and the like in a plurality of pixels.
Figure 4:
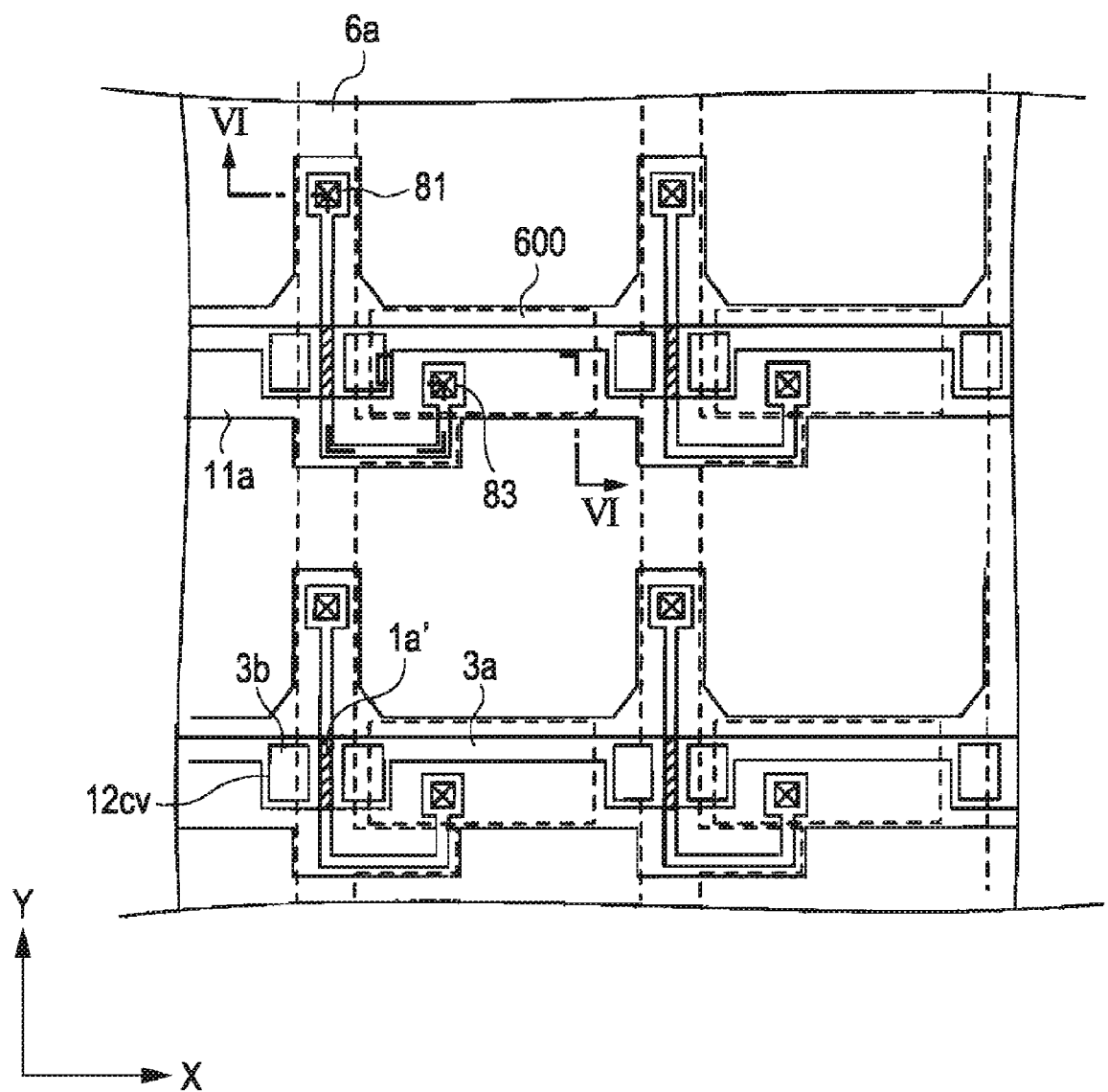
FIG. 4 is a plan view illustrating a partial configuration of pixels on a TFT array substrate, which corresponds to lower layers (lower layers located up to reference numeral 6a (data line, in FIG. 6) of a stacked structure.
Figure 5:
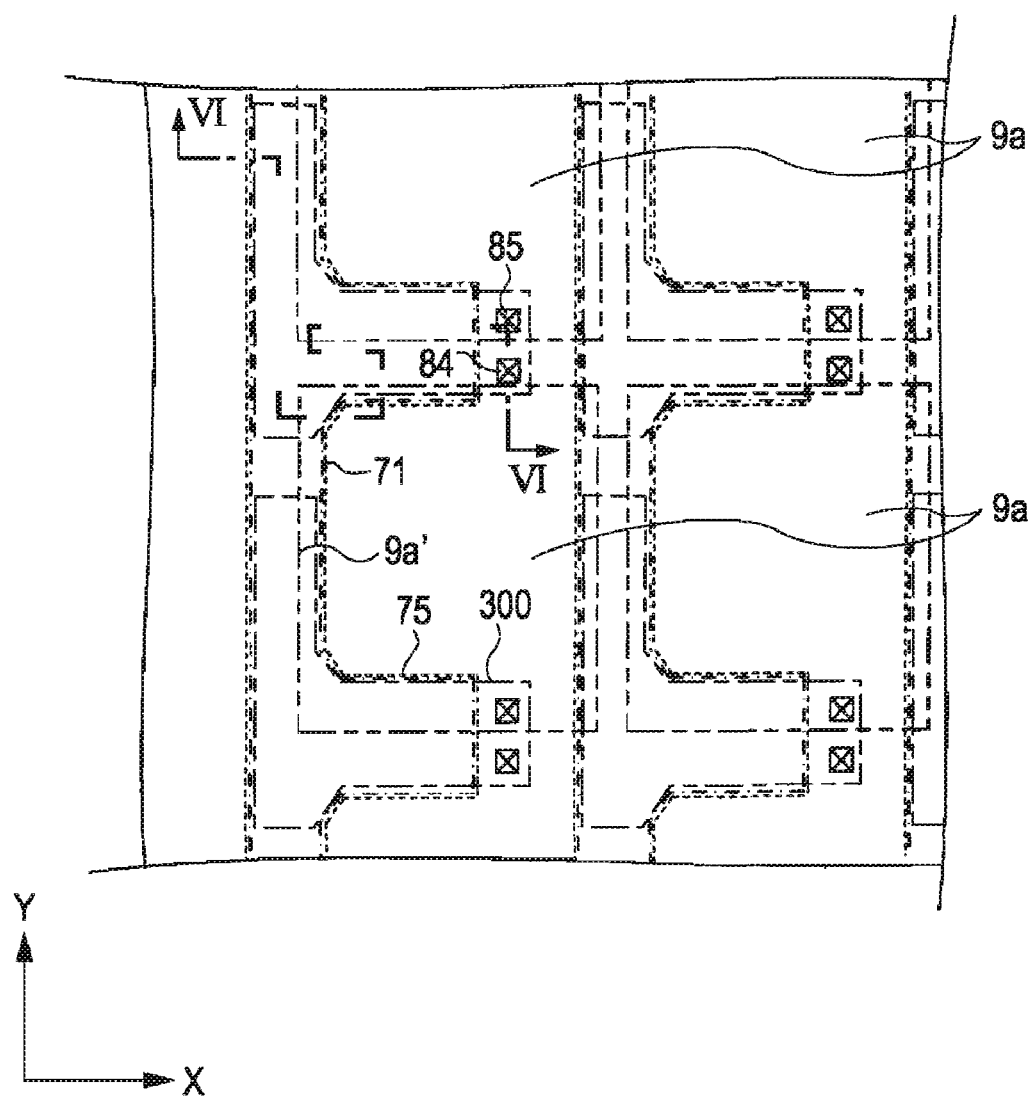
FIG. 5 is a plan view illustrating a partial configuration of pixels on the TFT array substrate, which corresponds to upper layers (upper layers located above reference numeral 6a (data line) in FIG. 6) of the stacked structure.
Figure 6:
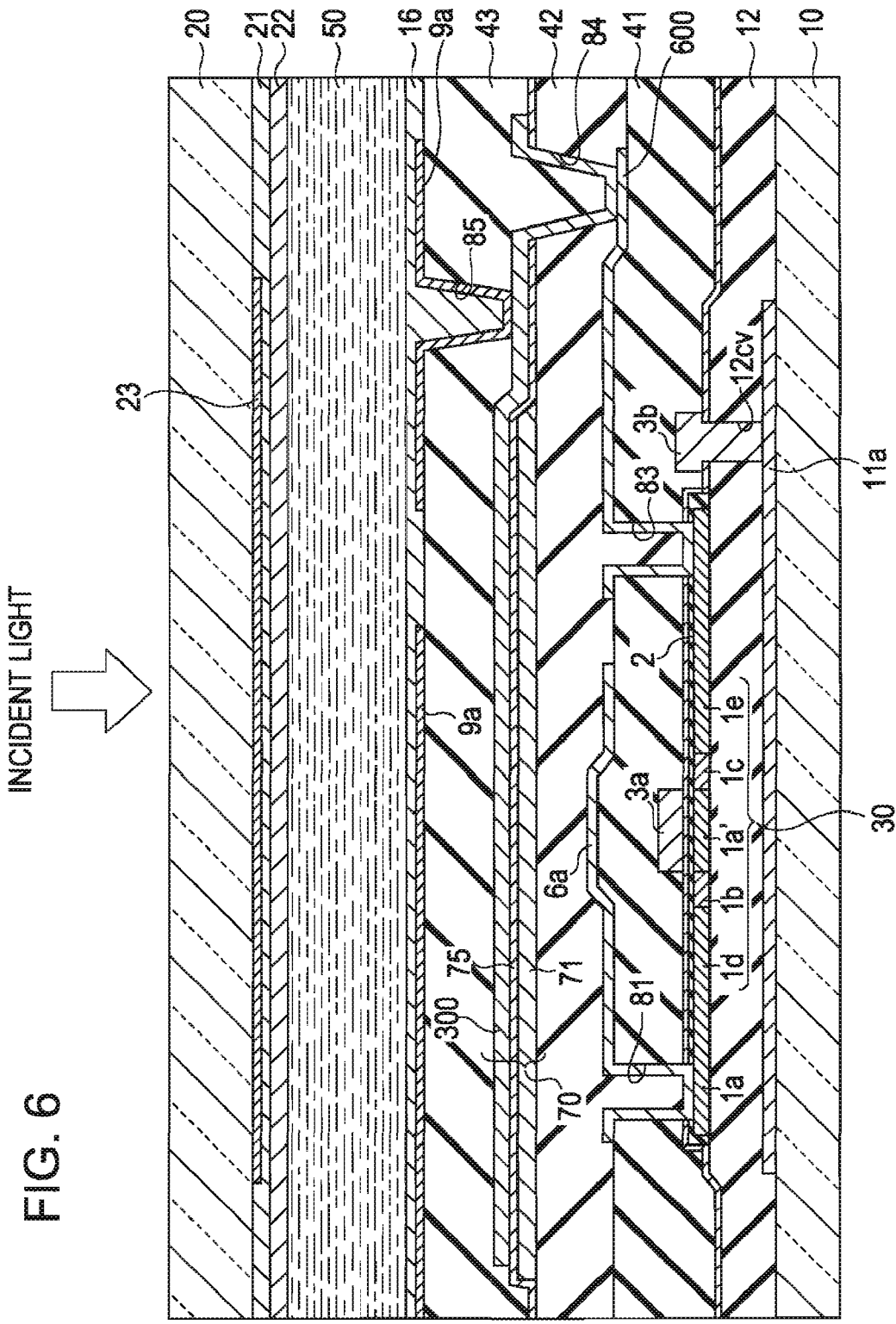
FIG. 6 is a cross-sectional view taken along the line VI-VI when FIGS. 4 and 5 overlap each other.

Next, the configuration of a pixel in the liquid crystal device according to the present embodiment will be described with reference to FIGS. 3 to 6. Here, FIG. 3 is an equivalent circuit diagram illustrating various elements, wiring lines, and the like, in a plurality of pixels that are formed in a matrix and form an image display region of the liquid crystal device. FIGS. 4 and 5 are plan views illustrating a partial configuration of pixels on the TFT array substrate 10. FIG. 4 corresponds to a lower portion of a stacked structure to be described below, and FIG. 5 corresponds to an upper portion of the stacked structure. FIG. 6 is a cross-sectional view taken along the line VI-VI when FIGS. 4 and 5 overlap each other. In addition, in FIG. 6, the scale of each layer or member is adjusted in order to have a recognizable size in the drawings.

Principal Configuration of Pixel Unit

Referring to FIG. 3, each of the plurality of pixels, which form the image display region of the liquid crystal device according to the present embodiment and are disposed in a matrix, includes a pixel electrode 9a and a TFT 30 that controls the pixel electrode 9a by a switching operation, and a corresponding data line 6a to which an image signal is supplied is electrically connected to a source of the TFT 30. Image signals VS1, VS2, . . . , and VSn may be supplied to the data lines 6a in a line-sequential manner in this order, or may be supplied to each group composed of the plurality of data lines 6a adjacent to each other.

Further, scanning lines 11a are electrically connected to corresponding gates of the TFTs 30, and scanning signals G1, G2, . . . , and Gm are supplied to the scanning lines 11a in a pulsed manner and a line-sequential manner as above in this order at predetermined timings. The pixel electrodes 9a are electrically connected to corresponding drains of the TFTs 30, and image signals VS1, VS2, . . . , and VSn supplied from the data lines 6a are supplied to the corresponding pixel electrodes 9a at predetermined timings by switching on the TFTs 30 serving as switching elements for only a predetermined period of time.

The image signals VS1, VS2, . . . , and VSn, which have predetermined levels and have been supplied to liquid crystal by the pixel electrodes 9a, are held between the pixel electrodes 9a and counter electrodes formed on the counter substrate for a predetermined period of time. In the liquid crystal, the alignment or order of a molecule group varies according to the voltage level being applied, and thus it is possible to modulate light and to perform gray-scale display. In the case of a normally white mode, the transmittance with respect to the incident light decreases according to the voltage applied in a unit of each pixel, while in the case of a normally black mode, the transmittance with respect to the incident light increases according to the voltage applied in the unit of each pixel. Therefore, as a whole, light having a contrast according to an image signal is emitted from the liquid crystal device.

In order to prevent the held image signals from leaking, a storage capacitor 70 is provided parallel to a liquid crystal capacitor formed between the pixel electrode 9a and the counter electrode. One electrode of the storage capacitor 70 is connected to the drain of the TFT 30 so as to be parallel to the pixel electrode 9a, and the other electrode of the storage capacitor 70 is connected to a capacitive line 400 having a fixed electric potential so as to have a constant electric potential.

Specific Configuration of Pixel Unit

Next, a specific configuration of a pixel for realizing the above-described operations will be described with reference to FIGS. 4 and 5.

In FIGS. 4 and 5, the respective circuit elements of the pixel are patterned to be formed on the TFT array substrate 10 as stacked conductive layers. The TFT array substrate 10 is formed of, for example, a glass, a quartz, an SOI, or a semiconductor, and the TFT array substrate 10 is disposed to face the counter substrate 20 formed of, for example, a glass or a quartz. Further, each of the circuit elements includes a first layer including the scanning line 11a, a second layer including the TFT 30, a third layer including the data line 6a, a fourth layer including the storage capacitor 70, and a fifth layer including the pixel electrode 9a, in this order from bottom to top. Furthermore, a base insulating layer 12 is provided between the first and second layers, a first interlayer insulating layer 41 is provided between the second and third layers, a second interlayer insulating layer 42 is provided between the third and fourth layers, and a third interlayer insulating layer 43 is provided between the fourth and fifth layers. Thus, it is possible to prevent the respective elements described above from being short-circuited. Here, the first to third layers are shown as lower layers in FIG. 4, and the fourth and fifth layers are shown as upper layers in FIG. 5.

Configuration of First Layer—Scanning Line, Etc.

In FIG. 4, the first layer includes the scanning lines 11a. Each of the scanning lines 11a is patterned to have a shape having a main line part extending in the X direction of FIG. 4 and a protruding part extending in the Y direction of FIG. 4 in which the data lines 6a extend. The scanning line 11a is formed of, for example, conductive polysilicon. Alternatively, the scanning line 11a may be formed of a metal simplex including at least one high-melting-point metal selected from a group of titanium (Ti), chromium (Cr), tungsten (W), tantalum (Ta), molybdenum (Mo), and the like, an alloy thereof, metal silicide, polysilicide, or a laminate thereof.

As shown in FIGS. 4 and 6, the scanning line 11a is disposed below the TFT 30 so as to cover a region opposite to a channel region 1a' and is formed of a conductive layer.

Configuration of Second Layer—TFT, Etc.

As shown in FIG. 6, the second layer includes the TFTs 30. Each of the TFTs 30 has, for example, an LDD (Lightly Doped Drain) structure and includes a gate electrode 3a, a semiconductor layer 1a, and an insulating layer 2 including a gate insulating layer for insulating the gate electrode 3a from the semiconductor layer 1a. The gate electrode 3a is formed of, for example, conductive polysilicon. The semiconductor layer 1a is formed of, for example, polysilicon, and includes the channel region 1a', a lightly-doped source region 1b, a lightly-doped drain region 1c, a heavily-doped source region 1d, and a heavily-doped drain region 1e. In addition, the TFT 30 preferably has the LDD structure; however, the TFT 30 may have an offset structure in which impurities are not injected into the lightly-doped source region 1b and the lightly-doped drain region 1c or have a self-aligning structure in which the heavily-doped source region 1d and the heavily-doped drain region 1e are formed by injecting heavily-doped impurities with the gate electrode 3a as a mask.

A part 3b of the gate electrode 3a of the TFT 30 is electrically connected to the scanning line 11a through a contact hole 12cv formed in the base insulating layer 12. The base insulating layer 12 is formed of, for example, a silicon oxide film, electrically isolates the first layer from the second layer, and is formed on the entire surface of the TFT array substrate 10 so as to prevent element characteristics of the TFT 30 from changing due to roughness or contamination caused by the abrasion of a substrate surface.

Further, the TFT 30 according to the present embodiment is a top gate type TFT. However, the TFT 30 may be a bottom gate type TFT.

Configuration of Third Layer—Data Line, Etc.

As shown in FIG. 6, the third layer includes the data lines 6a and a relay layer 600.

Each of the data lines 6a has a three-layered structure including an aluminum layer, a titanium nitride layer, and a silicon nitride layer in this order from below. The data line 6a is formed to partially cover the channel region 1a' of the TFT 30. Accordingly, by using the data line 6a that can be disposed to be adjacent to the channel region 1a', the channel region 1a' of the TFT 30 can be shielded from light incident from above. In addition, the data line 6a is electrically connected to the heavily-doped source region 1d of the TFT 30 through a contact hole 81 passing through the first interlayer insulating layer 41.

Further, on a surface of the data line 6a facing the channel region 1a', another conductive film having lower reflectivity than a conductive film, such as an aluminum layer forming a main body of the data line 6a, may be formed. Thus, it is possible to reduce the effect of light with respect to the channel region 1a'.

A relay layer 600 is formed as the same layer as the data lines 6a. The relay layer 600 and the data lines 6a are provided to be separated from each other, as shown in FIG. 4. Further, the relay layer 600 is electrically connected to the heavily-doped drain region 1e of the TFT 30 through a contact hole 83 passing through the first interlayer insulating layer 41.

The first interlayer insulating layer 41 is formed of, for example, NSG (non-silicate glass). Alternatively, the first interlayer insulating layer 41 may be formed of silicate glass, such as PSG (phosphorus silicate glass), BSG (boron silicate glass), or BPSG (boron phosphorus silicate glass), a silicon nitride, a silicon oxide, or the like.

Configuration of Fourth Layer—Storage Capacitor, Etc.

As shown in FIG. 6, the fourth layer has the storage capacitors 70. Each of the storage capacitors 70 is configured such that a capacitor electrode 300 and a lower electrode 71 are disposed to face each other with a dielectric layer 75 interposed therebetween. At this time, the capacitor electrode 300 is an example of an 'upper electrode' according to the invention, the lower electrode 71 is an example of a 'lower electrode' according to the invention, and the dielectric layer 75 is an example of an 'interlayer insulating layer' according to the invention.

An extending portion of the capacitor electrode 300 is electrically connected to the relay layer 600 through a contact hole 84 passing through the second interlayer insulating layer 42.

The capacitor electrode 300 or the lower electrode 71 formed of a metal simplex including at least one high-melting-point metal selected from a group of Ti, Cr, W, Ta, Mo, and the like, an alloy thereof, metal silicide, polysilicide, or a laminate thereof. Preferably, the capacitor electrode 300 or the lower electrode 71 is formed of tungsten silicide.

As shown in FIG. 5, the dielectric layer 75 is formed in non-opening regions, which are located between opening regions of pixels, in plan view above the TFT array substrate 10. That is, the dielectric layer 75 is rarely formed in the opening regions. The dielectric layer 75 is formed by using, for example, a silicon nitride layer having high permittivity, without considering the transmittance. Moreover, as a dielectric layer, it is possible to use a single-layered film or a multi-layered film formed of, for example, hafnium oxide ($HfO_2$), alumina ($Al_2O_3$), or tantalum oxide ($Ta_2O_5$), in addition to the silicon nitride layer.

Further, the second interlayer insulating film 42 is formed of, for example, NSG. Alternatively, the second interlayer insulating film 42 may be formed of silicate glass, such as PSG (phosphorus silicate glass), BSG (boron silicate glass), BPSG (boron phosphorus silicate glass), a silicon nitride, a silicon oxide, or the like. A surface of the second interlayer insulating layer 42 is subjected to a CMP (chemical mechanical polishing) process or a polishing process, a spin coat process, and a planarization process, such as a burying process with respect to recessed portions. Thus, unevenness of the lower layers due to the parts described above is removed, such that the surface of the second interlayer insulating layer 42 becomes planarized. Further, the planarization process may be performed on the surfaces of the other interlayer insulating layers.

Configuration of Fifth Layer—Pixel Electrode, Etc.

As shown in FIG. 6, the third interlayer insulating layer 43 is formed on the entire surface of the fourth layer, and the pixel electrodes 9a are formed on the third interlayer insulating layer 43 as the fifth layer. The third interlayer insulating layer 43 is formed of, for example, NSG. Alternatively, the third interlayer insulating layer 43 is formed of silicate glass, such as PSG, BSG, or BPSG, a silicon nitride, a silicon oxide, or the like. A surface of the third interlayer insulating layer 43 is subjected to a planarization process such as the CMP process, in the same manner as the second interlayer insulating layer 42.

As shown in FIGS. 4 and 5, the pixel electrodes 9a (an outline of each of the pixel electrodes 9a is shown by a dotted line 9a' in FIG. 5) are respectively disposed in the pixel regions that are arranged to be horizontally and vertically partitioned, and the data lines 6a and the scanning lines 11a are formed on boundaries therebetween so as to be arranged in a matrix. Further, each of the pixel electrodes 9a is formed of a transparent conductive film such as ITO (indium-tin oxide).

As shown in FIG. 6, the pixel electrode 9a is electrically connected to the extending portion of the capacitor electrode 300 through a contact hole 85 passing through the third interlayer insulating layer 43. Accordingly, the electric potential of the capacitor electrode 300, which is a conductive film located immediately below the pixel electrode 9a, is equal to that of the pixel electrode 9a. As a result, while the liquid crystal device operates, the electrical potential of a pixel is not adversely affected due to the parasitic capacitance between the pixel electrode 9a and the conductive film located below the pixel electrode 9a.

Further, as described above, the extending portion of the capacitor electrode 300 and the relay layer 600 are electrically connected to each other through the contact hole 84 and the relay layer 600 and the heavily-doped drain region 1e of the TFT 30 are electrically connected to each other through the contact hole 83. That is, the pixel electrode 4a and the heavily-doped drain region 1e of the TFT 30 are relay-connected to each other through the relay layer 600 and the extending portion of the capacitor electrode 300.

On the pixel electrodes 9a, an alignment layer 16 subjected to a predetermined alignment process, such as a rubbing process, is provided.

Until now, the configuration of the pixel at the TFT array substrate 10 side has been described.

On the other hand, in the case of the counter substrate 20, the counter electrodes 21 are provided on the entire surface of the counter substrate 20 facing the TFT array substrate 10, and an alignment layer 22 is formed thereon (below the counter electrode 21 in FIG. 6). The counter electrode 21 is formed of, for example, a transparent conductive film, such as ITO, in the same manner as the pixel electrodes 9a. Between the counter substrate 20 and the counter electrode 21, a light-shielding film 23 for covering at least a region facing the TFT 30 is provided in order to prevent optical leakage current from being generated in the TFT 30.

Between the TFT array substrate 10 and the counter substrate 20 described above, the liquid crystal layer 50 is provided. The liquid crystal layer 50 is formed by injecting liquid crystal into a space formed by sealing the peripheral portions of the substrates 10 and 20 with sealant. The liquid crystal layer 50 has a predetermined alignment state due to the alignment layers 16 and 22 subjected to an alignment process, such as a rubbing process, under a condition in which an electric field is not applied between the pixel electrode 9a and the counter electrode 21.

The configuration of the pixel described above is commonly applied to the respective pixels, as shown in FIGS. 4 and 5. In the above-mentioned image display region 10a (refer to FIG. 1), the pixels are periodically formed.

Figure 7:
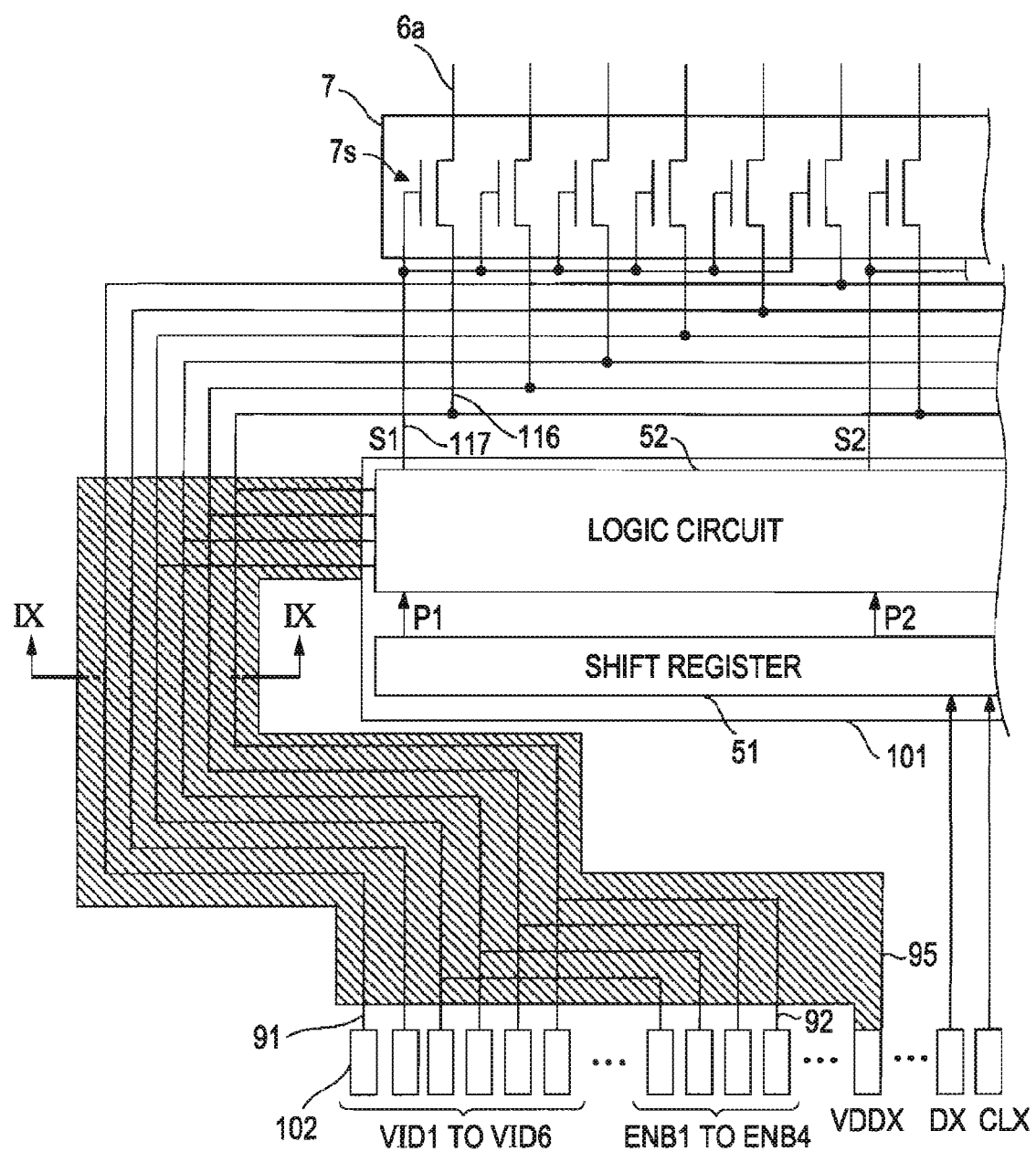
Figure 8:
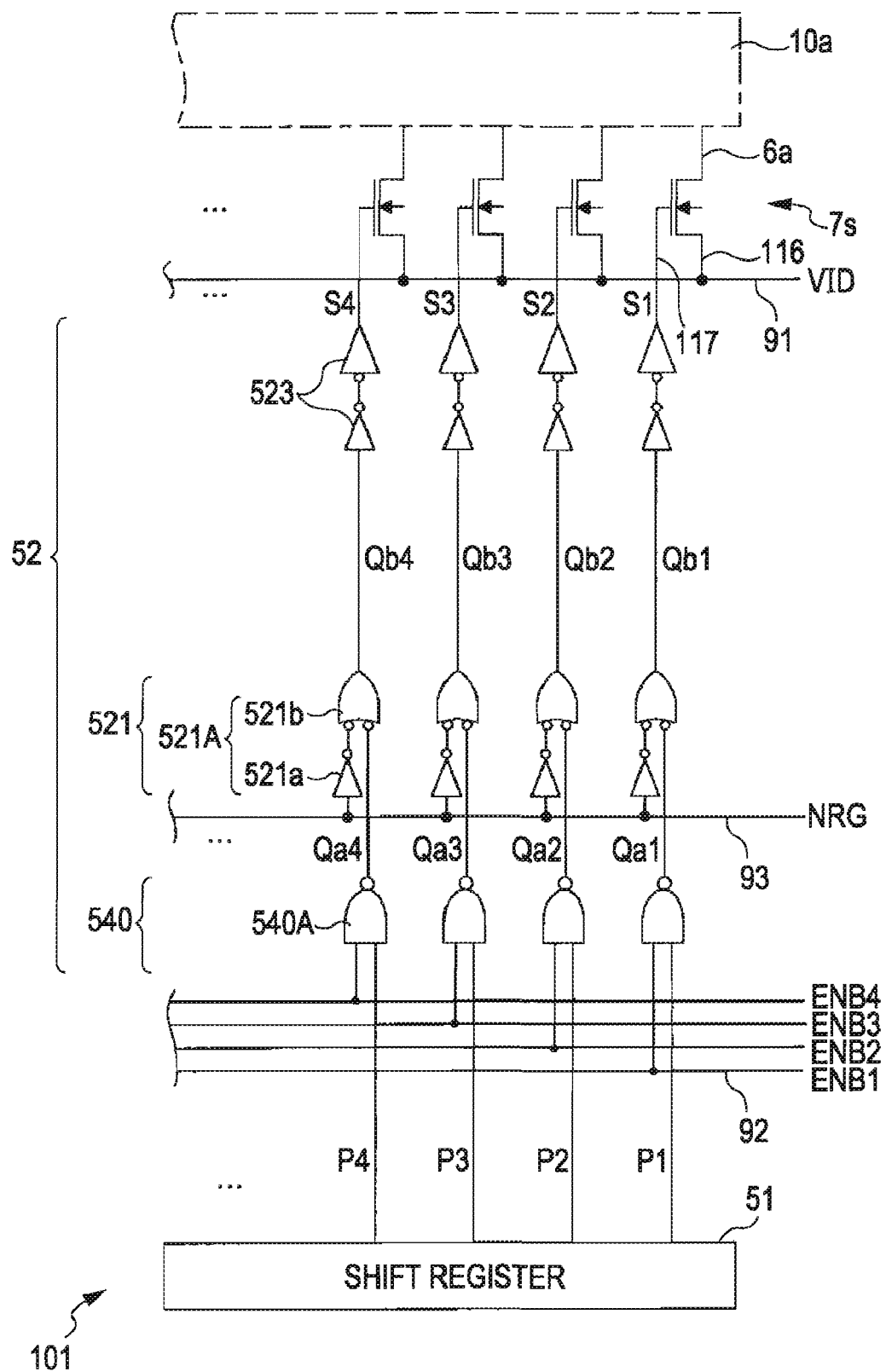
FIG. 8 is a circuit diagram illustrating a circuit system, which is related to shaping a transmitted signal, of the configuration shown in FIG. 7.

Next, a circuit configuration, which is related to a data line driving circuit and a sampling circuit, and the relationship of an electrical connection among signal lines and the like will be described with reference to FIGS. 7 and 8. Here, FIG. 7 is an explanatory view illustrating the circuit configuration, which is related to a data line driving circuit and a sampling circuit, and the relationship of the electrical connection among signal lines and the like. FIG. 8 is a circuit diagram illustrating a circuit system, which is related to shaping a transmitted signal, of the configuration shown in FIG. 7.

Referring to FIG. 7, the data line driving circuit 101 includes a shift register 51 and a logic circuit 52.

The shift register 51 sequentially outputs transmission signals Pi (where i=1, 2, . . . , and n) from each stage on the basis of an X clock signal CLX having a predetermined period (and an inverted signal CLX' of the X clock signal CLX) and a shift register start signal DX that are input to the data line driving circuit 101. While the liquid crystal device is operating, power VDDX (and power VSSX the electric potential of which is lower than that of the power VDDX) is supplied from an external circuit to the shift register 51 through the external circuit connection terminals 102 and a power line 95, which is an example of a 'constant-potential wiring line' according to the invention, and thus transistors forming the shift register 51 are driven.

The logic circuit 52 includes a pulse width restriction unit, shapes the pulse waveforms of the transmission signals Pi, which are sequentially output from the shift register 51, on the basis of enable signals ENB1 to ENB4, and finally outputs a sampling circuit driving signal Si on the basis of the shaped transmission signals Pi. In FIG. 8, the logic circuit 52 includes a pulse width control unit 540, a precharge circuit 521, and an inversion circuit 523.

As shown in FIG. 8, the pulse width control unit 540 includes logic circuits that shape the waveforms of the transmission signals Pi output from the shift register 51. More specifically, the pulse width control unit 540 includes unit circuits 540A provided in correspondence with respective stages of the shift register 51, and each of the unit circuits 540A is formed by a NAND circuit.

Referring to FIG. 8, the transmission signal Pi, which is output from a corresponding stage of the shift register 51, and one of the enable signals ENB1 to ENB4, which are supplied to four enable signal lines 92 that are examples of 'a plurality of signal lines' according to the invention, are input to a gate of each NAND circuit 540A. In addition, as power for the NAND circuit 540A, the power VDDX (and VSSX) is supplied to the NAND circuit 540A through a wiring line (not shown) in FIG. 8. The power VDDX is a signal input to a drain of a transistor forming the NAND circuit 540A, and the power VSSX is a signal input to a source of a transistor forming the NAND circuit 540A.

The NAND circuit 540A shapes the transmission signal Pi by performing a logic AND operation between the input transmission signal Pi and the corresponding enable signals ENB1 to ENB4. Thus, the NAND circuit 540A outputs a shaped signal Qai that is obtained by shaping the transmission signal Pi. In addition, each of the unit circuits 540A may include an inversion circuit in addition to the NAND circuit 540A, the inversion circuit serving to invert logics of the transmission signal Pi or the enable signals ENB1 to ENB4, which are input to the NAND circuit 540A, and a logic of the shaped signal Qai output from the NAND circuit 540A.

The waveform of the transmission signal Pi is trimmed by the pulse width control unit 540 on the basis of the waveforms of the enable signals ENB1 to ENB4 each having a pulse width smaller than that of the transmission signal Pi, and the pulse shape, such as the pulse width or the pulse period, is limited.

The logic circuit 52 includes a precharge circuit 521 provided corresponding to the respective stages of the shift register 51. A unit circuit 521A is formed to substantially serve as a NOR circuit including an inversion circuit 521a, which inverts the logic of a precharge selection signal NRG supplied to a precharge signal supply line 93, and a NAND circuit 521b having gates to which the shaped signal Qai and the precharge selection signal NRG whose logic has been inverted by the inversion signal 521a are input. In the NOR circuit 521A, a logic OR operation between the shaped signal Qai and the precharge selection signal NRG is performed and then any one of the shaped signal Qai and the precharge selection signal NRG is output as an output signal Qbi. The output signal Qbi is output as a sampling circuit driving signal Si through two inversion circuits 523.

Referring back to FIG. 7, a branched line 116, which is branched from an image signal line 91 that is an example of 'a plurality of signal lines' according to the invention, is connected to a source of a sampling switch 7s, such as a TFT, included in the sampling circuit 7. Further, a sampling circuit driving signal line 117 connected to the data line driving circuit 101 is connected to a gate of a sampling switch 302. Accordingly, while the liquid crystal device is operating, an image signal that is applied from an external circuit to the external circuit connection terminals 102 for image signals VID1 to VID6 is supplied to the sampling circuit 7 through the branched line 116 branched from the image signal line 91. Then, the image signal is sampled at timing according to the sampling circuit driving signal Si that is supplied from the data line driving circuit 101 through the sampling circuit driving signal line 117. Then, the sampled image signal is supplied to the corresponding data lines 6a.

The image signal, which is supplied to the sampling circuit 7 through the branched line 116 branched from an image signal line 91, may be provided in a line-sequential manner. However, in the present embodiment, the image signal is supplied to each group having six data lines 6a so as to correspond to each of the image signals that are serial-to-parallel-converted into six phases. Further, the expansion number of phases of an image signal is not limited to the six phases. For example, an image signal expanded into a plurality of phases, such as nine phases, twelve phases, or twenty-four phases, may be supplied to a set of the data lines 6a, the number of data lines 6a in one set corresponding to the number of expanded phases.

Figure 9:
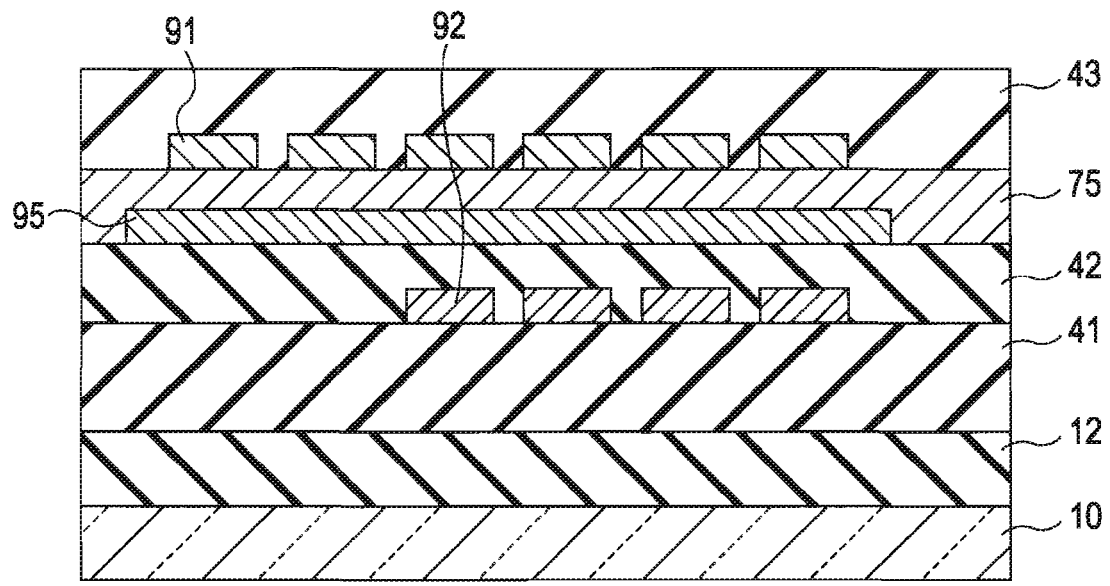
FIG. 9 is a cross-sectional view taken along the line IX-IX of FIG. 7.
Figure 10:
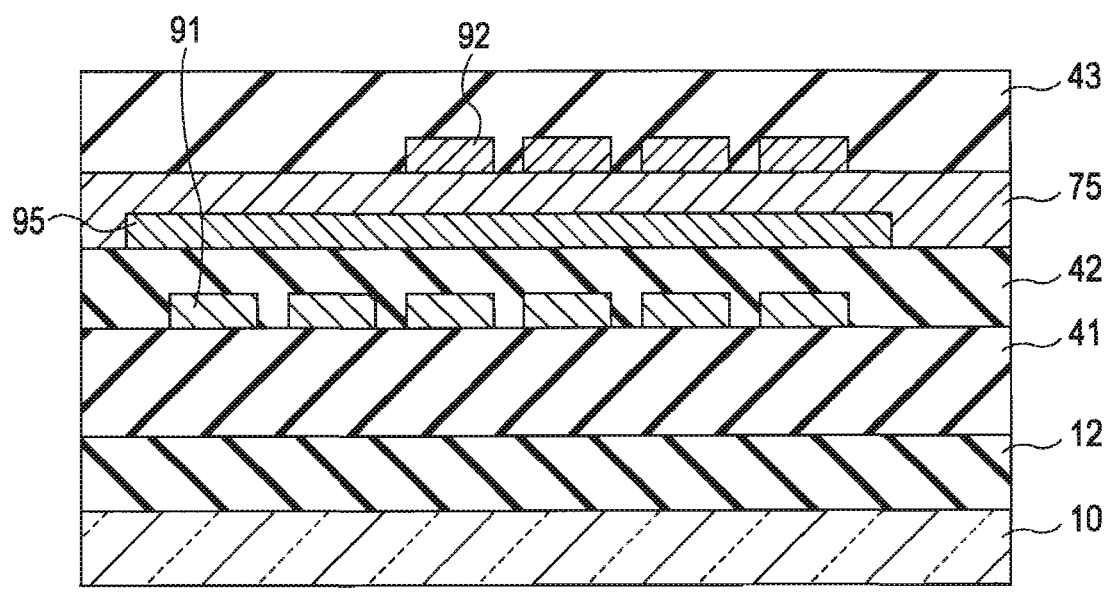
FIG. 10 is a cross-sectional view of the same object as FIG. 9, in a first modification.
Figure 11:
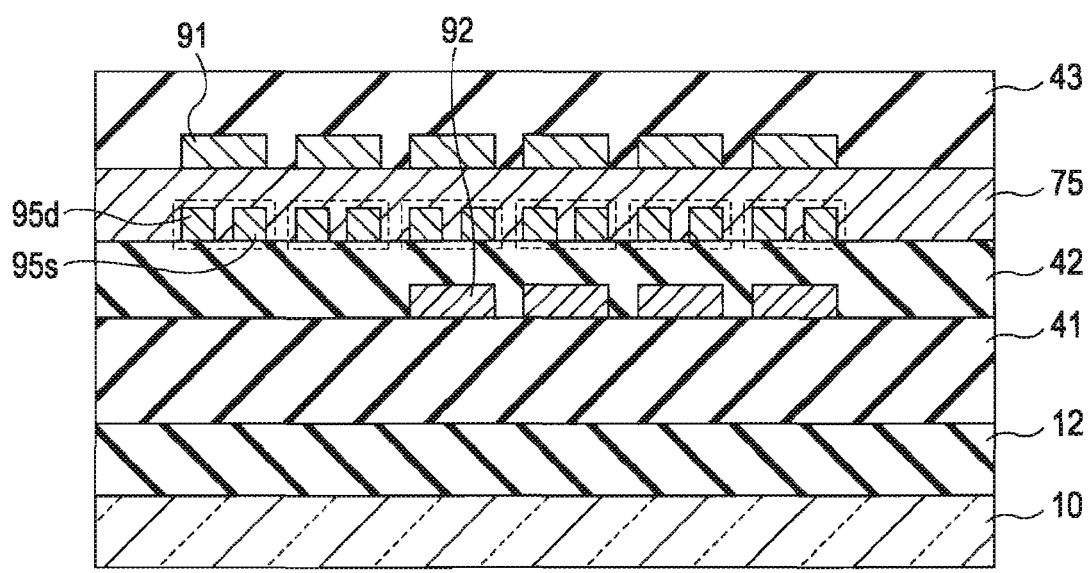
FIG. 11 is a cross-sectional view of the same object as FIG. 9, in a second modification.

Next, signal lines of the liquid crystal device according to the present embodiment will be described with reference to FIGS. 6 and 7 and FIGS. 9 to 11. Here, FIG. 9 is a cross-sectional view taken along the line IX-IX of FIG. 7. FIG. 10 is a cross-sectional view of the same object as FIG. 9, in a first modification. FIG. 11 is a cross-sectional view of the same object as FIG. 9, in a second modification. In FIGS. 9 to 11, the scale of each layer or member is adjusted in order to have a recognizable size in the drawings.

In FIG. 7, signal lines 90, such as the image signal lines 91, enable signals 92, and the power line 95, are connected between the corresponding external circuit connection terminals 102 and the data line driving circuit 101. Further, wiring lines, through which clock signals, various control signals, a power signal, or the like for driving the data line driving circuit 101 and the scanning line driving circuit 104 are supplied, are provided as the signal lines 90.

As shown in FIG. 9, in the present embodiment, in particular, the signal lines 90, such as the image signal lines 91, the enable signals 92, and the power line 95, are formed on a plurality of different conductive layers with the second interlayer insulating layer 42 and the dielectric layer 75 therebetween. Accordingly, the signal lines 90, such as the image signal lines 91, the enable signals 92, and the power line 95, can be disposed so as to overlap at least partially in plan view above the TFT array substrate 10. As a result, it is possible to dispose a large number of signal lines 90 within a predetermined region of a substrate, as viewed from the normal direction of the substrate, such that the signal lines 90 are not short-circuited by each other. That is, it is possible to dispose a larger number of signal lines 90 while making the width of each wiring line large. Thus, the image display region 10a can be made large, and at the same time, it is possible to reduce the entire TFT array substrate 10 by reducing the peripheral region surrounding the image display region 10a. As a result, the entire liquid crystal device can be made small.

Further, in the present embodiment, the plurality of signal lines 90 are formed on different conductive layers according to the frequency range of the signals. Specifically, as shown in FIG. 9, the enable signal lines 92 for supplying the enable signals ENB1 to ENB4 therethrough, which have frequencies higher than the image signals VID1 to VID6, are formed on a conductive layer that is different from a conductive layer on which the image signal lines 91 for supplying the image signals therethrough are formed. Further, the enable signal line 92 is an example of a 'first frequency signal line' according to the invention, and the image signal line 91 is an example of a 'second frequency signal line' according to the invention. Furthermore, the power line 95 is provided between the image signal lines 91 and the enable signal lines 92 with the dielectric layer 75 and the second interlayer insulating layer 42 interposed therebetween. Accordingly, since the electric potential of the power VDDX supplied through the power line 95 is constant, the power line 95 serves as a shielding layer between the image signal lines 91 and the enable signal lines 92. That is, the power line 95 can serve to reduce electrical interference between the image signals and the enable signals. In particular, electrical noises with respect to the image signals VID1 to VID6, which are generated because the frequencies of the enable signals ENB1 to ENB4 are higher than those of the image signals VID1 to VID6, can be reduced. As a result, it is possible to display high-quality images. Further, by forming the signal lines 90, through which signals having frequencies higher than those of the image signals, for example, the clock signal CLK for driving the data line driving circuit 101, are supplied, on a conductive layer different from the conductive layer on which the image signal lines 91 are formed, it is possible to reduce the electrical noises with respect to the image signals VID1 to VID6.

Further, in the present embodiment, as shown in FIGS. 6 and 9, the image signal lines are formed by using the same layer as a conductive layer forming the capacitor electrodes 300, the power line 95 is formed by using the same layer as a conductive layer forming the lower electrodes 71, and the enable signal lines 92 are formed by using the same layer as a conductive layer forming the data lines 6a. Accordingly, the image signal lines 91 and the capacitor electrodes 300 can be formed at the same time, the power lines 95 and the lower electrodes 71 can be formed at the same time, and the enable signal lines 92 and the data lines 6a can be formed at the same time. That is, the plurality of signal lines and the shielding layer can be formed by using a plurality of conductive layers without causing the manufacturing process to be complicated. At this time, the signal lines 90, such as the image signal lines 91, the power lines 95, and the enable signal lines 92, can be formed by using the same layer as any one of the conductive layers forming the capacitor electrodes 300, the lower electrodes 71, and the data lines 6a. In addition, the signal lines 90, such as the image signal lines 91, the Dower lines 95, and the enable signal lines 92, may be formed by using the same layer as conductive layers other than the conductive layers forming the capacitor electrodes 300, the lower electrodes 71, or the data lines 6a.

Further, in the present embodiment, as shown in FIG. 9, the enable signal lines 92, the power line 95, and the image signal lines 91 are sequentially formed in this order on the TFT array substrate 10 with the second interlayer insulating layer 42 interposed between the enable signal lines 92 and the power line 95 and the dielectric layer 75 interposed between the power line 95 and the image signal lines 91. That is, the image signal lines 91 are formed to be close to a surface of a stacked structure. Accordingly, it is possible to provide less contact holes required to electrically connect the image signal lines 91 with the external circuit connection terminals 102 formed in the vicinity of the surface of the stacked structure. As a result, the resistances of the image signal lines 91 can be reduced, which makes it possible to display high-quality images. On the other hand, the enable signal lines 92 are formed to be close to the TFT array substrate 10 in the stacked structure. In addition, TFTs or the like, which are included in the logic circuit 52, electrically connected to the enable signal lines 92 are also formed to be close to the TFT array substrate 10. Accordingly, it is possible to provide less contact holes between the enable signal lines 92 and the TFTs or the like included in the logic circuit 52. As a result, the enable signal lines 92 and the logic circuit 52 can be easily connected to each other.

Alternatively, in a first modification shown in FIG. 10, the image signal lines 91, the power line 95, and the enable signal lines 92 may be sequentially formed in this order on the TFT array substrate 10 with the second interlayer insulating layer 42 interposed between the image signal lines 91 and the power line 95 and the dielectric layer 75 interposed between the power line 95 and the enable signal lines 92. That is, the enable signal lines 92 may be formed to be close to the surface of the stacked structure. In this case, it is possible to dissipate or eliminate heat, which is generated from the enable signal lines 92 because the frequencies of the enable signal lines ENB1 to ENB4 are high, through the surface of the stacked structure. That is, it is possible to easily prevent the enable signal lines 92 from being overheated.

Referring back to FIG. 7, in the present embodiment, the width of the power line 95 is larger than those of the image signal lines 91 and the enable signal lines 92 in plan view above the TFT array substrate 10. That is, the power line 95 is formed to partially overlap the plurality of image signal lines 91 and the plurality of enable signal lines 92 in plan view above the TFT array substrate 10. Accordingly, the power line 95 can reliably serve as a shielding layer such that the electrical interference between the image signal lines 91 and the enable signal lines 92 can be further reduced. Further, since the width of the power line 95 is large, it is possible to reduce the resistance of the power line 95. Thus, due to the power line 95, it is possible to supply the data line driving circuit 101 with the power VDDX, which is stable.

Further, in a second modification shown in FIG. 11, power includes a set of power VDDX having a predetermined electric potential and power VSSX having an electric potential lower than the electric potential of the power VDDX, and the width of a power line 95d for supplying the power VDDX and the width of a power line 95s for supplying the power VSSX may be at least partially smaller than those of the image signal lines 91 or those of the enable signal lines 92. Here, the power VDDX is an example of a 'first potential' according to the invention, and the power VSSX is an example of a 'second potential' according to the invention. In addition, the power line 95d is an example of a 'first-potential power line' according to the Invention, and the power line 95s is an example of a 'second-potential power line' according to the invention. Further, the power lines 95d and 95s may be provided as one set such that the power lines 95d and 95s are disposed to be at least partially parallel to each other and overlap the image signal lines 91 and the enable signal lines 92 in plan view above the TFT array substrate 10. In this case, the electrical noises between the image signal lines 91 and enable signal lines 92 are reduced due to the power lines 95d and 95s. Here, in the case when the power line 95d is provided between one image signal line 91 and one enable signal line 92 and the power line 95s is provided between another image signal line 91 and another enable signal line 92, an electrical effect between the one image signal line 91 and the one enable signal line 92 is different from that between another image signal line 91 and another enable signal line 92. However, in the present embodiment, since the power lines 95d and 95s are formed as one set so as to respectively overlap the image signal lines 91 and the enable signal lines 92, it is possible to almost obtain uniform shielding effects.

Figure 12:
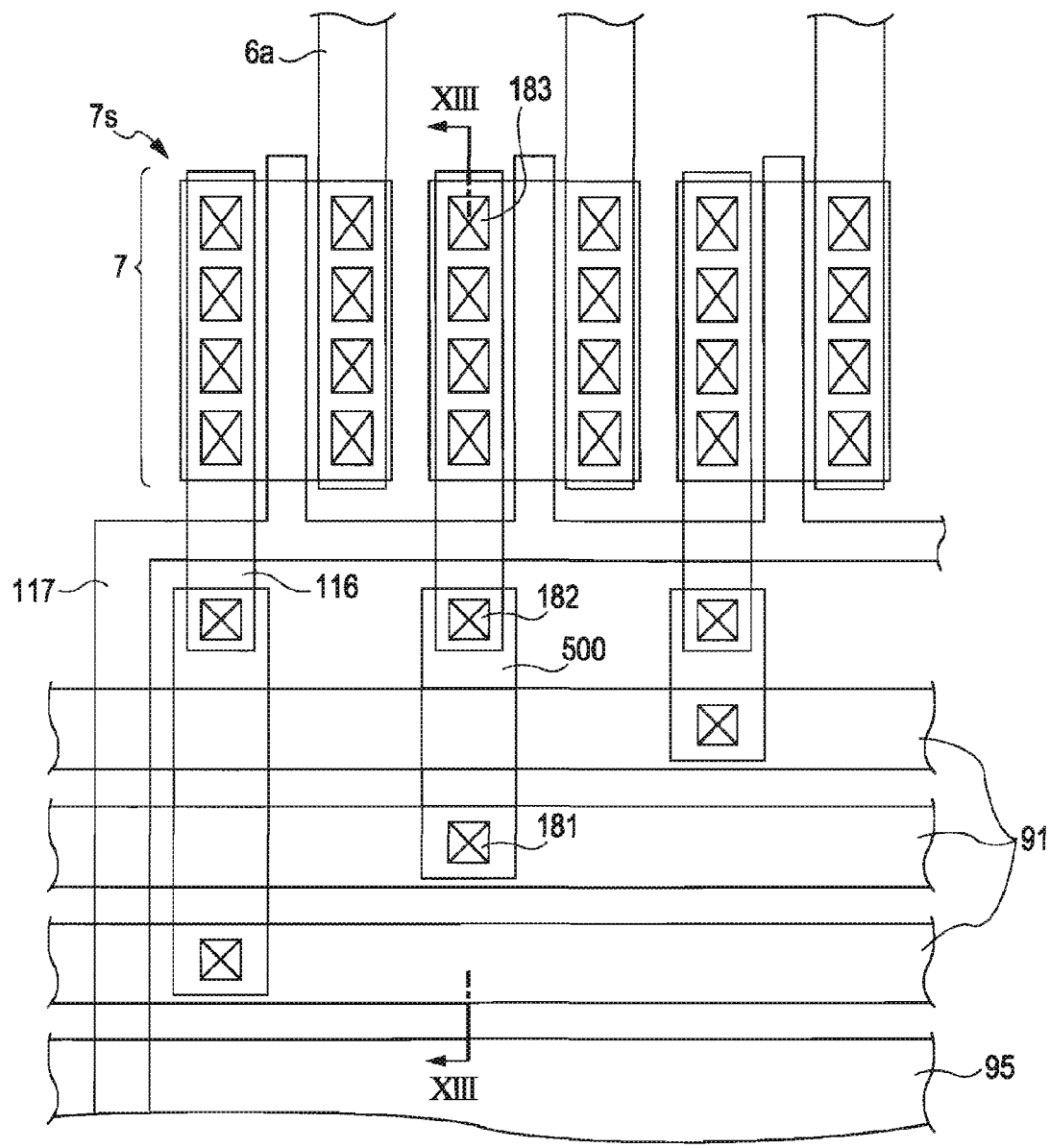
FIG. 12 is a view illustrating a layout of image signal lines and branched lines.
Figure 13:
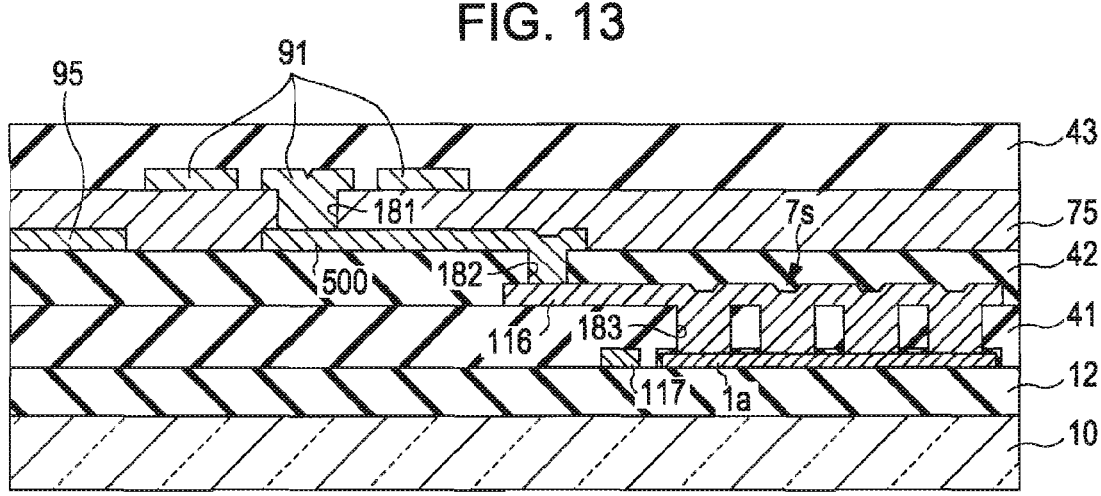
FIG. 13 is a cross-sectional view taken along the line XIII-XIII of FIG. 12.

Next, a detailed configuration on electrical connections between the image signal lines and the sampling circuit will be described with reference to FIGS. 12 and 13. Here, FIG. 12 is a view illustrating a layout of image signal lines and branched lines. FIG. 13 is a cross-sectional view taken along the line XIII-XIII of FIG. 12.

As shown in FIG. 12, on the TFT array substrate 10, the sampling circuit driving signal line 117 is provided so as to start from the data line driving circuit 101 and then cross the image signal lines 91. In addition, the sampling circuit driving signal line 117 is provided so as to be branched for each sampling switch 7s and then extend in parallel to the data lines 6a. Further, the branched line 116 is provided such that the branched line 116 starts from a terminal thereof, which is electrically connected to the corresponding image signal line 91 through the contact hole 181 provided in the dielectric layer 75, and then extends in parallel to the data lines 6a. In addition, a part of the branched line 116 forms a source electrode of the sampling switch 7s, a part of the data line 6a forms a drain electrode of the sampling switch 7s, and a part of the sampling circuit driving signal line 117 forms a gate electrode of the sampling switch 7s. In addition, as shown in FIGS. 12 and 13, the branched line 116 is electrically connected to the semiconductor layer 1a of the sampling switch 7s through the contact hole 183 provided in the first interlayer insulating layer 41.

As shown in FIG. 13, in the present embodiment, the branched line 116 includes a relay line 500 whose one end is electrically connected to the corresponding image signal line 91 and which is an example of a 'relay layer' according to the invention. The relay line 500 is formed by using the same layer as the conductive layer forming the power line 95 serving as a shielding layer, that is, the conductive layer forming the lower electrodes 71. In addition, the relay line 500 and the branched line 116 excluding the relay line 500 are electrically connected to each other through the contact hole 182 provided in the second interlayer insulating layer 42. That is, the relay line 500 and the image signal line 91, which is an example of an 'upper signal line' according to the invention, are electrically connected to each other through the contact hole 181 provided in the dielectric layer 75, and the relay line 500 and the sampling switch 7s included in the sampling circuit 7, which is an example of a 'lower peripheral circuit' according to the invention, are electrically connected to each other through the contact hole 182 provided in the second interlayer insulating layer 42. Thus, the connection of the image signal line 91 to the sampling switch 7s included in the sampling circuit 7 through one contact hole can be facilitated due to the large distance between layers forming the image signal line 91 and the sampling switch 7s. Further, since the relay line 500 is formed by using the same layer as the power line 95 serving as the shielding layer, the stacked structure and the manufacturing process do not become complicated.

Figure 14:
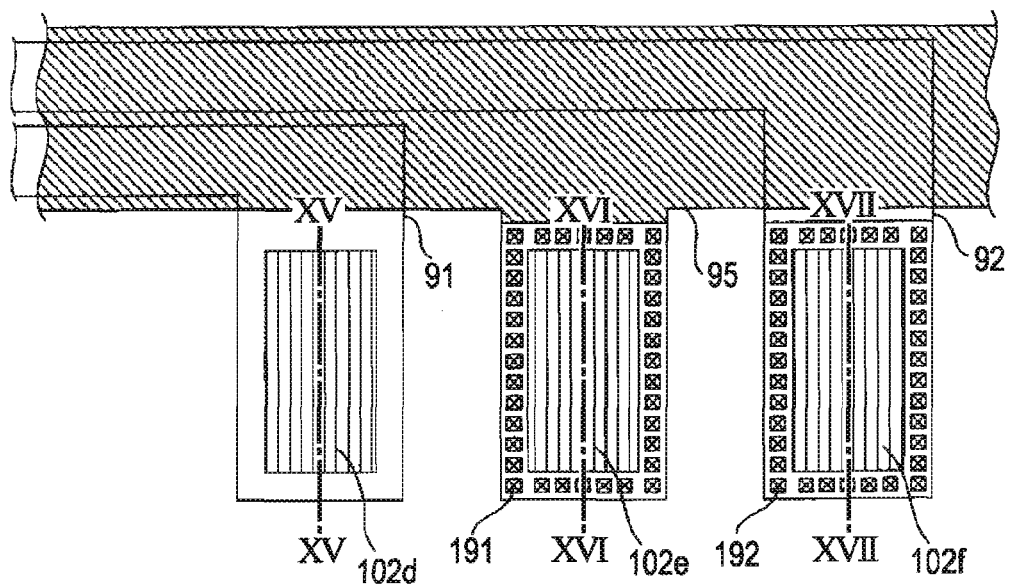
FIG. 14 is a view illustrating a layout of signal lines in the vicinity of external circuit connection terminals.
Figure 15:
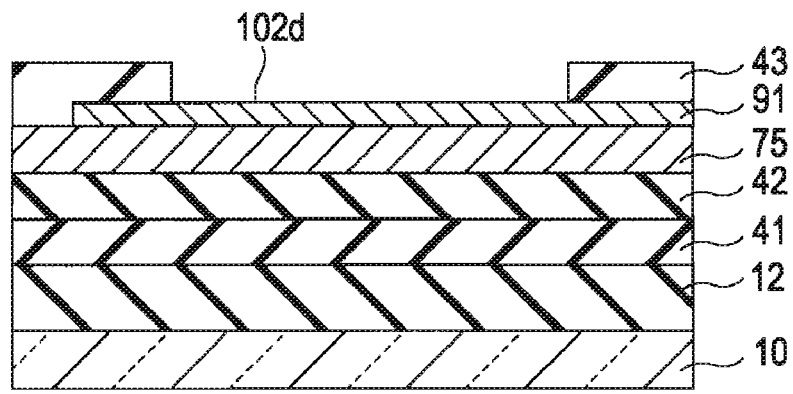
FIG. 15 is a cross-sectional view taken along the line XV-XV of FIG. 14.
Figure 16:
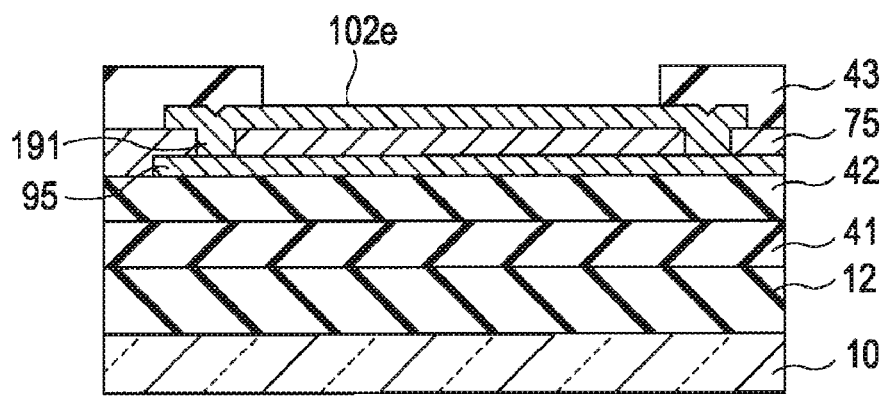
FIG. 16 is a cross-sectional view taken along the line XVI-XVI of FIG. 14.
Figure 17:
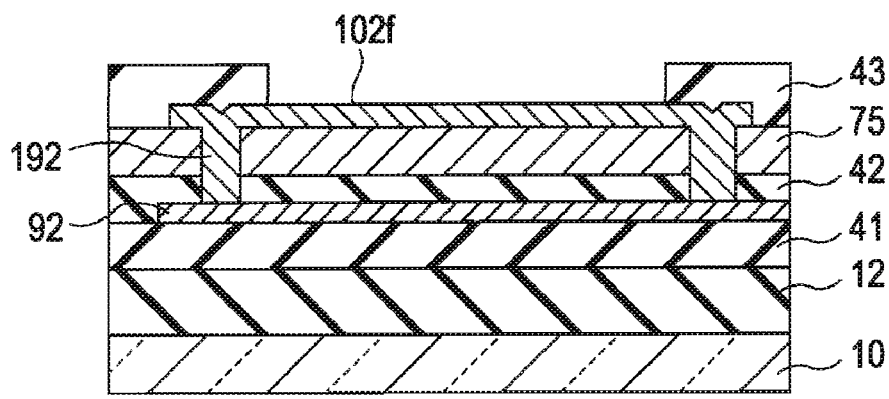
FIG. 17 is a cross-sectional view taken along the line XVII-XVII of FIG. 14.

Next, a layout of signal lines in the vicinity of the external circuit connection terminals will be described with reference to FIGS. 14 to 17. Here, FIG. 14 is a view illustrating the layout of signal lines in the vicinity of external circuit connection terminals. FIG. 15 is a cross-sectional view taken along the line XV-XV of FIG. 14. FIG. 16 is a cross-sectional view taken along the line XVI-XVI of FIG. 14. FIG. 17 is a cross-sectional view taken along the line XVII-XVII of FIG. 14. In addition, in FIGS. 15 to 17, the scale of each layer or member is adjusted in order to have a recognizable size in the drawings.

Referring to FIG. 14, the image signal line 91 is electrically connected to an external circuit connection terminal 102d, the power line 95 is electrically connected to an external circuit connection terminal 102e, and the enable signal line 92 is electrically connected to an external circuit connection terminal 102f. The external circuit connection terminals 102d, 102e, and 102f are disposed to be adjacent to each other. As shown in FIGS. 15 to 17, the external circuit connection terminals 102d, 102e, and 102f are formed by using the same layer as the conductive layer forming the image signal line 91, that is, the conductive layer forming the capacitor electrode 300.

As shown in FIGS. 14 and 15, the image signal line 91 is integrally formed on the same layer as the external circuit connection terminal 102d.

As shown in FIGS. 14 and 16, the power line 95 is electrically connected to the external circuit connection terminal 102e through a contact hole 191 that is provided in the dielectric layer 75 in the vicinity of the external circuit connection terminal 102e.

As shown in FIGS. 14 and 17, the enable signal line 92 is electrically connected to the external circuit connection terminal 102f through a contact hole 192 that is provided in the vicinity of the external circuit connection terminal 102e so as to pass through the dielectric layer 75 and the second interlayer insulating layer 42.

As shown in FIG. 14, in the present embodiment, the power line 95 partially overlaps the image signal line 91 and the enable signal line 92, which are electrically connected to the external circuit connection terminals 102d and 102f adjacent to the external circuit connection terminal 102e, respectively, in plan view above the TFT array substrate 10. That is, a part of the power line 95 exists even in a region located in the vicinity of a portion where the image signal line 91 and the enable signal line 92 are electrically connected to the external circuit connection terminals 102d and 102e, respectively. Accordingly, even in the region located in the vicinity of the portion where the image signal line 91 and the enable signal line 92 are electrically connected to the external circuit connection terminals 102d and 102e, it is possible to reliably reduce the electrical interference between the image signal line 91 and the enable signal line 92 by means of the power line 95 serving as a shielding layer. In addition, the power line 95 serving as a shielding layer may be disposed to partially or completely overlap the external circuit connection terminal 102d or the external circuit connection terminal 102e in plan view above the TFT array substrate 10.

As described above, in the liquid crystal device according to the present embodiment, the size of the TFT array substrate 10 can be reduced, and accordingly, it is possible to make the liquid crystal device small. Further, since the electrical interference between different kinds of signal can be reduced, high-quality images can be displayed.

Second Embodiment

Figure 18:
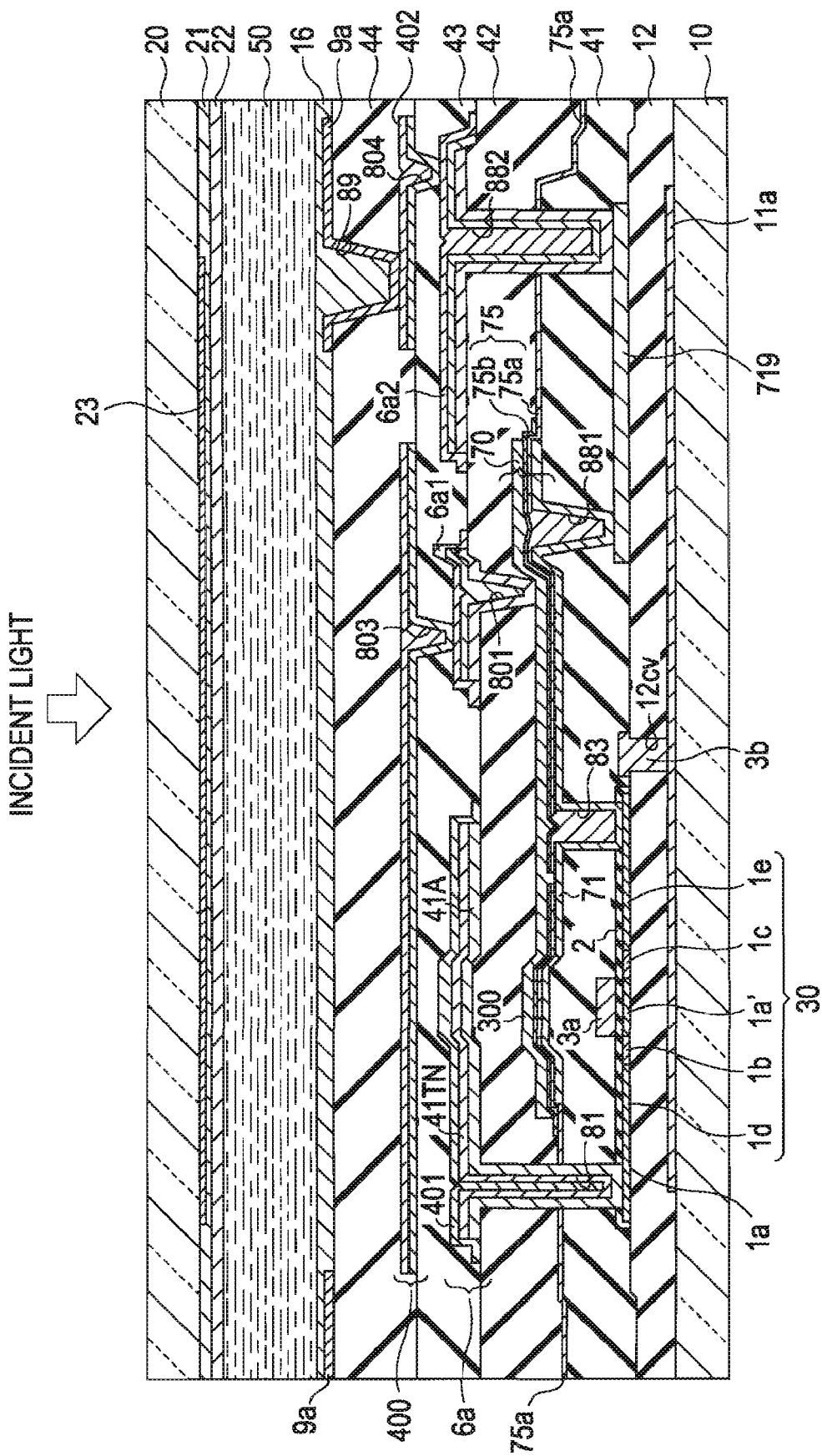
FIG. 18 is a cross-sectional view of the same object as FIG. 6, in a second embodiment.

Next, a liquid crystal device according to a second embodiment will be described with reference to FIG. 18. Here, FIG. 18 is a cross-sectional view of the same object as FIG. 6 in the second embodiment. In addition, in FIG. 18, the same members as those in the first embodiment shown in FIG. 6 have the same reference numerals, and a detailed description thereof will be omitted.

Referring to FIG. 18, each pixel in the liquid crystal device according to the present embodiment is formed by stacking a first layer including a scanning line 11a, a second layer including a gate electrode 3a, a third layer including a storage capacitor 70, a fourth layer including a data line 6a, a fifth layer including a capacitive line 400, and a sixth layer including a pixel electrode 9a in a sequential manner from below.

The configurations of the first and second layers are approximately equal to the configuration of the pixel in the first embodiment.

Configuration of Third Layer—Storage Capacitor, Etc.

As shown in FIG. 18, the third layer has the storage capacitors 70. The capacitor electrode 300 is electrically connected to the capacitive line 400. A lower electrode 71 is electrically connected to the pixel electrode 9a and a heavily-doped drain region 1e of a TFT 30. In addition, the capacitive line 400 is an example of an 'upper electrode' according to the invention.

The lower electrode 71 and the heavily-doped drain region 1e are connected to each other through a contact hole 83 that is opened in a first interlayer insulating layer 41. In addition, the lower electrode 71 and the pixel electrode 9a are electrically connected to each other through contact holes 881, 882, 804, and 89, a relay electrode 719, a second relay electrode 6a2, and a third relay electrode 402.

The capacitor electrode 300 is formed of a metal simplex including at least one high-melting-point metal selected from a group of Ti, Cr, W, Ta, Mo, and the like, an alloy thereof, metal silicide, polysilicide, or a laminate thereof. Preferably, the capacitor electrode 300 is formed of tungsten silicide. Further, the lower electrode 71 is formed of, for example, conductive polysilicon.

configuration of Fourth Layer—Data Line, Etc.

As shown in FIG. 18, the fourth layer includes the data lines 6a. Each of the data lines 6a has a three-layered structure including an aluminum layer, a titanium nitride layer, and a silicon nitride layer in this order from below. Further, on the fourth layer, a second relay electrode 6a2 is formed by using the same layer as the layer forming the data lines 6a.

The data line 6a is electrically connected to a heavily-doped source region 1d of the TFT 30 through a contact hole 81 passing through a first interlayer insulating layer 41 and a second interlayer insulating layer 42. In addition, as described above, the second relay electrode 6a2 is electrically connected to the relay electrode 719 through the contact hole 882 passing through the first inter-layer insulating layer 41 and the second interlayer insulating layer 42.

Configuration of Fifth Layer—Capacitive Line, Etc.

As shown in FIG. 18, the fifth layer includes the capacitive lines 400 and a third relay electrode 402. The capacitive line 400 has a two-layered structure obtained by stacking, for example, an aluminum layer and a titanium nitride layer. The capacitive line 400 and the capacitor electrode 300 are connected to each other through a contact hole 801. In addition, the third relay electrode 402 is formed by using the same layer as the layer forming the capacitive line 400. As described above, the third relay electrode 402 relays between the second relay electrode 6a2 and the pixel electrode 9a through the contact holes 804 and Configuration of Sixth Layer—Pixel Electrode, Etc.

As shown in FIG. 18, the fourth interlayer insulating layer 44 includes the contact hole 89 by which the pixel electrode 9a and the third relay electrode 402 are electrically connected to each other.

Until now, the configuration of the pixel in the present embodiment has been described.

As described above, in the pixel according to the present embodiment, four layers forming the capacitive line 400, the data line 6a, the capacitor electrode 300, and the lower electrode 71 are conductive layers, respectively. Accordingly, the shielding layer or the signal lines 90, such as the image signal line 91, the power line 95, and the enable signal line 92 can be formed by using the same layer as any one of the four conductive layers forming the capacitive line 400, the data line 6a, the capacitor electrode 300, and the lower electrode 71. Thus, the signal lines 90, such as the image signal line 91, the power line 95, and the enable signal line 92 can be formed on conductive layers different from the shielding layer without causing the manufacturing process to be complicated. Accordingly, it is possible to reduce the size of the TFT array substrate 10 required for the signal lines 90, such as the image signal line 91, the power line 95, and the enable signal line 92, and to reduce the electrical interference between different kinds of signal through the shielding layer.

Electronic Apparatus

Next, cases in which the liquid crystal device, which is the above-described electro-optical device, is applied to various electronic apparatuses will be described.

Figure 19:
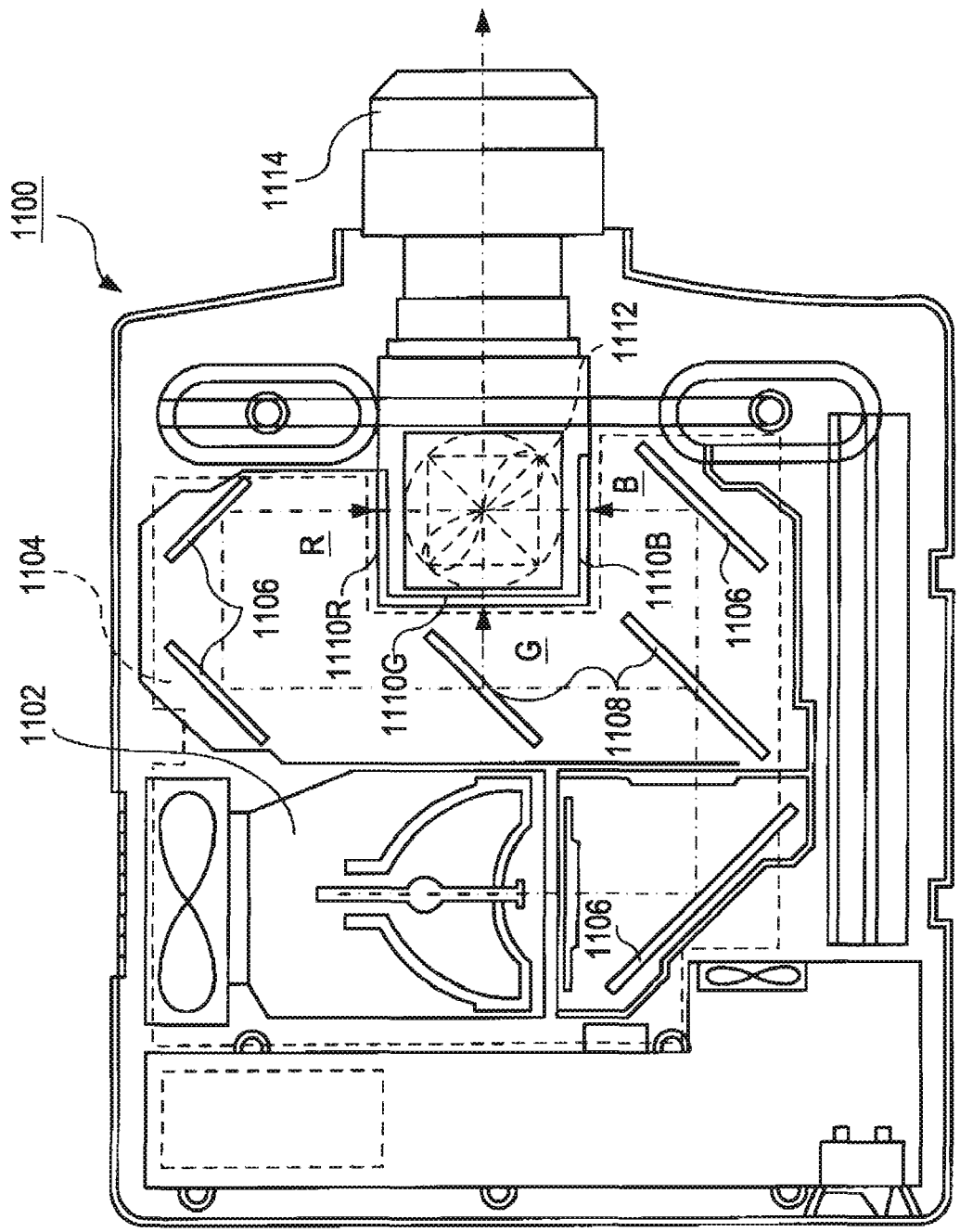
FIG. 19 is a plan view illustrating the configuration of a projector, which is an example of an electronic apparatus, to which an electro-optical device is applied.

First, a projector that uses the liquid crystal device as a light valve will be described. FIG. 19 is a plan view illustrating an example of the configuration of a projector. As shown in FIG. 19, a projector 1100 includes a lamp unit 1102 formed of a white light source, such as a halogen lamp. Projection light emitted from the lamp unit 1102 is separated into light components having three primary colors of R (red), G (green), and B (blue) by four mirrors 1106 and two dichroic mirrors 1108, and the light components having the three primary colors are respectively incident on liquid crystal panels 1110R, 1110B, and 1110G, serving as light valves, corresponding to the respective primary colors.

The configurations of the liquid crystal panels 1110R, 1110G, and 1110B are the same as that of the above-described liquid crystal device, and the liquid crystal panels 1110R, 1110B, and 1110G are respectively driven by R, G, and B primary color signals supplied from an image signal processing circuit. The light components modulated by the liquid crystal panels 1110R, 1110B, and 1110G are incident on a dichroic prism 1112 from three directions. The dichroic prism 1112 causes the light components having the R and B colors to be refracted by 90° and the light component having the G color to go straight. Thus, images, each having one of the three primary colors, are synthesized, such that a color image is projected onto a screen or the like through a projection lens 1114.

Here, in display images formed on the respective liquid crystal panels 1110R, 1110B, and 1110G, it is necessary that the display image formed on the liquid crystal panel 1110G be left and right inverted with respect to the display image formed on the liquid crystal panels 1110R and 1110B.

Further, since the light components corresponding to the primary colors of B, G, and B are respectively incident on the liquid crystal panels 1110R, 1110B, and 1110G by the dichroic mirrors 1108, it is not necessary to prepare a color filler.

Figure 20:
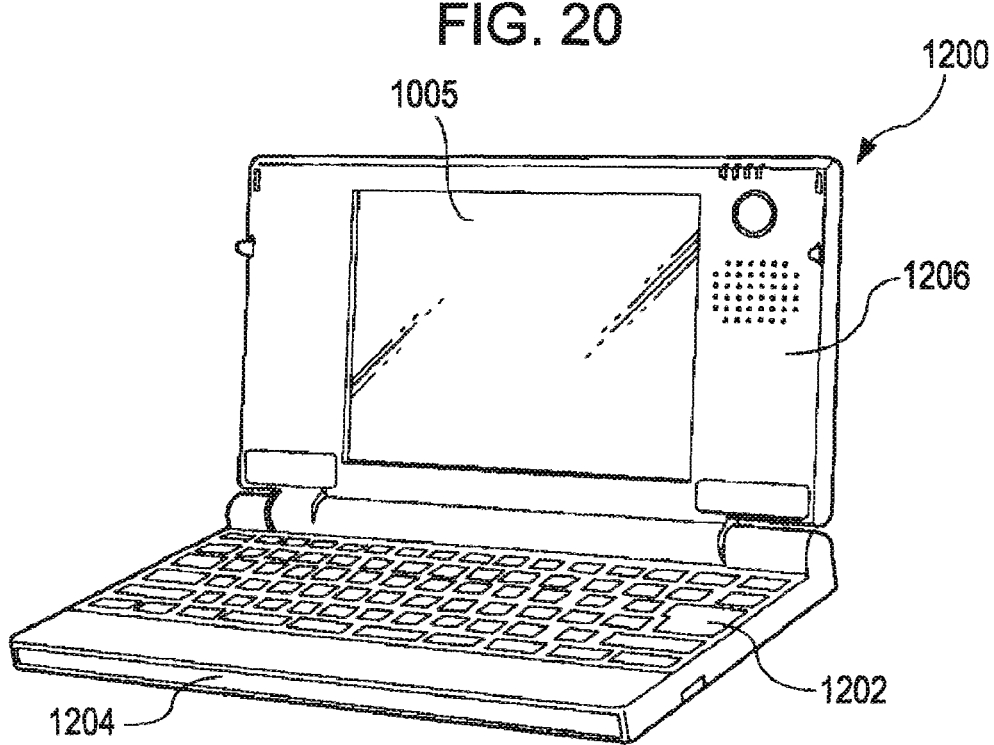
FIG. 20 is a plan view illustrating the configuration of a personal computer, which is an example of an electronic apparatus, to which the electro-optical device is applied.

Next, a case in which the liquid crystal device is applied to a mobile personal computer will be described. FIG. 20 is a perspective view illustrating the configuration of a personal computer. Referring to FIG. 20, a computer 1200 includes a main body unit 1204 having a keyboard 1202, and a liquid crystal display unit 1206. The liquid crystal display unit 1206 includes a backlight provided on a bottom surface of a liquid crystal device 1005 described above.

Figure 21:
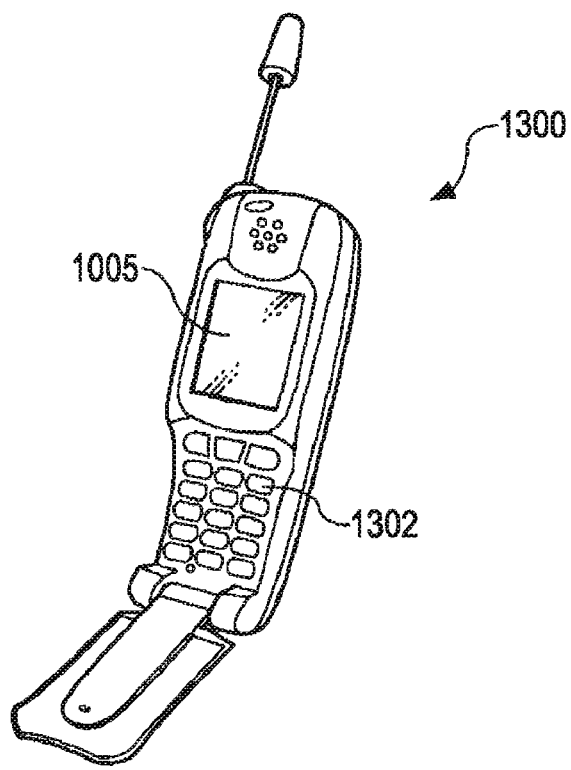
FIG. 21 is a plan view illustrating the configuration of a mobile phone, which is an example of an electronic apparatus, to which an electro-optical device is applied.

Furthermore, a case in which the liquid crystal device is applied to a mobile phone will be described. FIG. 21 is a perspective view illustrating the configuration of a mobile phone. Referring to FIG. 21, a mobile phone 1300 includes a plurality of operation buttons 1302 and a reflective liquid crystal device 1005. The reflective liquid crystal device 1005 may be provided with a frontlight on a front surface thereof as necessary.

Furthermore, the electro-optical device can be applied to various electronic apparatuses, such as a liquid crystal television, a viewfinder-type or monitor-direct-view-type video tape recorder, a car navigation device, a pager, an electronic organizer, an electronic calculator, a word processor, a workstation, a video phone, a POS terminal, a device having a touch panel, and the like, in addition to the electronic apparatuses described above with reference to FIGS. 19 to 21.

Furthermore, the invention can be applied to a reflective liquid crystal device (LCOS) in which elements are formed on a silicon substrate, a plasma display panel (PDP), field emission type display devices (FED, SED), an organic EL display device, and the like, in addition to the liquid crystal device described in the above embodiments.

It should be understood that the invention is not limited to the above-described embodiments, but various modifications can be made within the scope without departing from the subject matter or spirit of the invention defined by the appended claims and the entire specification. Therefore, an electro-optical device and an electronic apparatus having the electro-optical device that accompany such modifications still fall within the technical scope of the invention.

What is claimed is:

1. An electro-optical device comprising:
a substrate;
a plurality of pixels provided in a pixel region on the substrate;
peripheral circuits that are provided in a peripheral region surrounding the pixel region, the peripheral circuits being for controlling the plurality of pixels;
a plurality of signal lines that supply signals for controlling the peripheral circuits, that at least partially overlap each other in the peripheral region, and that are formed in a plurality of different conductive layers with interlayer insulating layers interposed therebetween; and
a shielding layer that is provided between layers where the plurality of signal lines overlap each other, so as to overlap the plurality of signal lines.

2. The electro-optical device according to claim 1, further comprising:
a plurality of data lines and a plurality of scanning lines that are provided in the pixel region on the substrate so as to cross each other,
wherein the pixels are provided to correspond to intersections between the data lines and the scanning lines and each of the pixels includes a storage capacitor formed by sequentially stacking a lower electrode, a dielectric layer, and an upper electrode on the substrate, and
each of the plurality of conductive layers and the shielding layer are the same layer as any one of the conductive layers forming the data lines, the lower electrodes, and the upper electrodes.

3. The electro-optical device according to claim 1,
wherein the plurality of signal lines is formed by using the conductive layers having different predetermined frequencies from each other.

4. The electro-optical device according to claim 3,
wherein the plurality of signal lines includes first-frequency signal lines through which signals having a first frequency are supplied and second-frequency signal lines through which signals having a second frequency lower than the first frequency are supplied, and
the first-frequency signal lines, the shielding layer, and the second-frequency signal lines are sequentially stacked in this order on the substrate with interlayer insulating layers interposed therebetween.

5. The electro-optical device according to claim 3, wherein the plurality of signal lines includes first-frequency signal lines through which signals having a first frequency are supplied and second-frequency signal lines through which signals having a second frequency lower than the first frequency are supplied, and the second-frequency signal lines, the shielding layer, and the first-frequency signal lines are sequentially stacked in this order on the substrate with interlayer insulating layers interposed therebetween.

6. The electro-optical device according to claim 4, wherein the shielding layer serves as a constant-potential wiring line through which a predetermined electric potential is supplied.

7. The electro-optical device according to claim 6, wherein the width of the constant-potential wiring line is at least partially larger than that of at least one of the first-frequency signal line and the second-frequency signal line, in plan view above the substrate.

8. The electro-optical device according to claim 6 wherein the width of the constant-potential wiring line is at least partially smaller than that of at least one of the first-frequency signal line and the second-frequency signal line, in plan view above the substrate.

9. The electro-optical device according to claim 8, wherein the predetermined electric potential is a power supply potential having a first electric potential and a second electric potential lower than the first potential, the constant-potential wiring line includes a first-potential power line through which the first electric potential is supplied and a second-potential power line through which the second electric potential is supplied, the width of the constant-potential wiring line is at least partially smaller than any one of the first-frequency signal line and the second-frequency signal line, and the first-potential power line and the second-potential power line are disposed to be at least partially parallel to each other and to overlap the first-frequency signal line and the second-frequency signal line, respectively, in plan view above the substrate.

10. The electro-optical device according to claim 1, further comprising:

a relay layer that is formed by using the same layer as the shielding layer so as to electrically relay-connect upper signal lines of the plurality of signal lines with lower peripheral circuits of the peripheral circuits, the upper signal lines being formed above the shielding layer and the lower peripheral circuits being formed below the shielding layer.

11. The electro-optical device according to claim 1, further comprising:

a plurality of external circuit connection terminals that are electrically connected to the plurality of signal lines and the shielding layer, respectively, and are disposed in the peripheral region on the substrate, and the shielding layer at least partially overlaps the signal lines electrically connected to the external circuit connection terminals adjacent to the corresponding external circuit connection terminals electrically connected to the shielding layer.

12. An electronic apparatus comprising the electro-optical device according to claim 1.

* * * * *